(12) United States Patent
Chen et al.

(10) Patent No.: US 12,401,585 B2
(45) Date of Patent: Aug. 26, 2025

(54) DEPLOYING SYMMETRIC ROUTING

(71) Applicant: Palo Alto Networks, Inc., Santa Clara, CA (US)

(72) Inventors: Jia Chen, Palo Alto, CA (US); Saurabh Dixit, San Jose, CA (US); Anil Saini, Milpitas, CA (US); Shu Lin, Saratoga, CA (US); Hao Long, Campbell, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 233 days.

(21) Appl. No.: 18/104,070

(22) Filed: Jan. 31, 2023

(65) Prior Publication Data

US 2024/0259290 A1 Aug. 1, 2024

(51) Int. Cl.
*H04L 45/02* (2022.01)
*H04L 45/00* (2022.01)
*H04L 45/12* (2022.01)

(52) U.S. Cl.
CPC ............ *H04L 45/02* (2013.01); *H04L 45/123* (2013.01); *H04L 45/22* (2013.01)

(58) Field of Classification Search
CPC ........ H04L 45/02; H04L 45/123; H04L 45/22
See application file for complete search history.

(56) References Cited

U.S. PATENT DOCUMENTS

| | | | |
|---|---|---|---|
| 11,991,211 B1* | 5/2024 | Gangur | H04L 63/0263 |
| 2003/0120788 A1* | 6/2003 | Berthaud | H04L 67/1034 |
| | | | 714/4.11 |
| 2003/0126268 A1* | 7/2003 | Berthaud | H04L 63/0209 |
| | | | 709/229 |
| 2009/0196297 A1* | 8/2009 | Jabr | H04L 45/302 |
| | | | 370/395.32 |
| 2011/0069714 A1* | 3/2011 | Le Pennec | H04L 45/36 |
| | | | 370/401 |

* cited by examiner

*Primary Examiner* — Abdulkader M Alriyashi
(74) *Attorney, Agent, or Firm* — Van Pelt, Yi & James LLP

(57) ABSTRACT

Techniques for deploying symmetric routing are disclosed. A system, process, and/or computer program product for deploying symmetric routing includes routing network traffic from a client over a security access network provider virtual private network (VPN) access to a customer network, and enforcing symmetric routing crossing an autonomous system (AS) based on one or more prepended AS routing numbers in a first routing table for inbound traffic and/or based on one or more weights and one or more local preferences in a second routing table for outbound traffic.

19 Claims, 24 Drawing Sheets

Hot Potato Routing Technique Summary

| | Import/Export routes | GW Primary PE | Backup PE | The Rest of PEs | Control Point | GW-route tagging |
|---|---|---|---|---|---|---|
| Primary EBGP peer | Export | AS = 1 | AS = 4 | AS = 7 | Exit PE And First hop PE | (AS#&0xFFFF):(Primary SiteBGP#&0xFFFF) |
| | Import | LP = 800000 Weight = 65000 | LP = 900000 | LP = 800000 | Ingress PE And RR | |
| 2nd EBGP peer | Export | AS = 2 | AS = 5 | AS = 8 | Exit PE And First hop PE | |
| | Import | LP = (800000 - 10) Weight = 65000 - 100 | LP = 900000 | LP = 800000 | Ingress PE And RR | |

DEPLOYING SYMMETRIC ROUTING

BACKGROUND OF THE INVENTION

Typically, when crossing an autonomous system (AS) boundary from a provider network to a customer network and/or vice versa, routing across the AS boundary may not conform to symmetric routing standards and/or hot potato routing standards. The AS, by default, utilizes cold potato routing and not hot potato routing. An issue can arise when a link failure or a node failure occurs. In these scenarios, an end-to-end path crossing an autonomous system boundary cannot guarantee symmetric routing. In other words, when a link failure or a node failure occurs, no network traffic loss cannot be guaranteed as a result.

When an asymmetrical routing scenario occurs, network traffic can be dropped by a firewall which is within the end-to-end path, so network traffic cannot reach its intended destination because the firewall requires symmetric routing. To prevent asymmetric routing issues upon the link failure or the node failure, the issue needs to be transparent to the customer network when addressing the issue. In other words, a customer should not need to change their network configuration, instead, all of the changes will be made on a provider's side of the autonomous system.

Furthermore, source network address translation (SNAT) cannot be used to address the asymmetrical routing issue because of IP address related security features. For example, to implement IP address security, the user ID may require an administrator to maintain a source IP address. As a result, SNAT cannot be used. Also, since security policy decisions may be made based on user context, which includes a user's actual IP address, when an IP address is translated to another IP address for a packet, user context information is changed/lost. As a result, the security policy is ineffective because the user context information is changed/lost.

BRIEF DESCRIPTION OF THE DRAWINGS

Various embodiments of the invention are disclosed in the following detailed description and the accompanying drawings.

FIG. 15 is a table summarizing various hot potato routing techniques.

DETAILED DESCRIPTION

Figure 1:
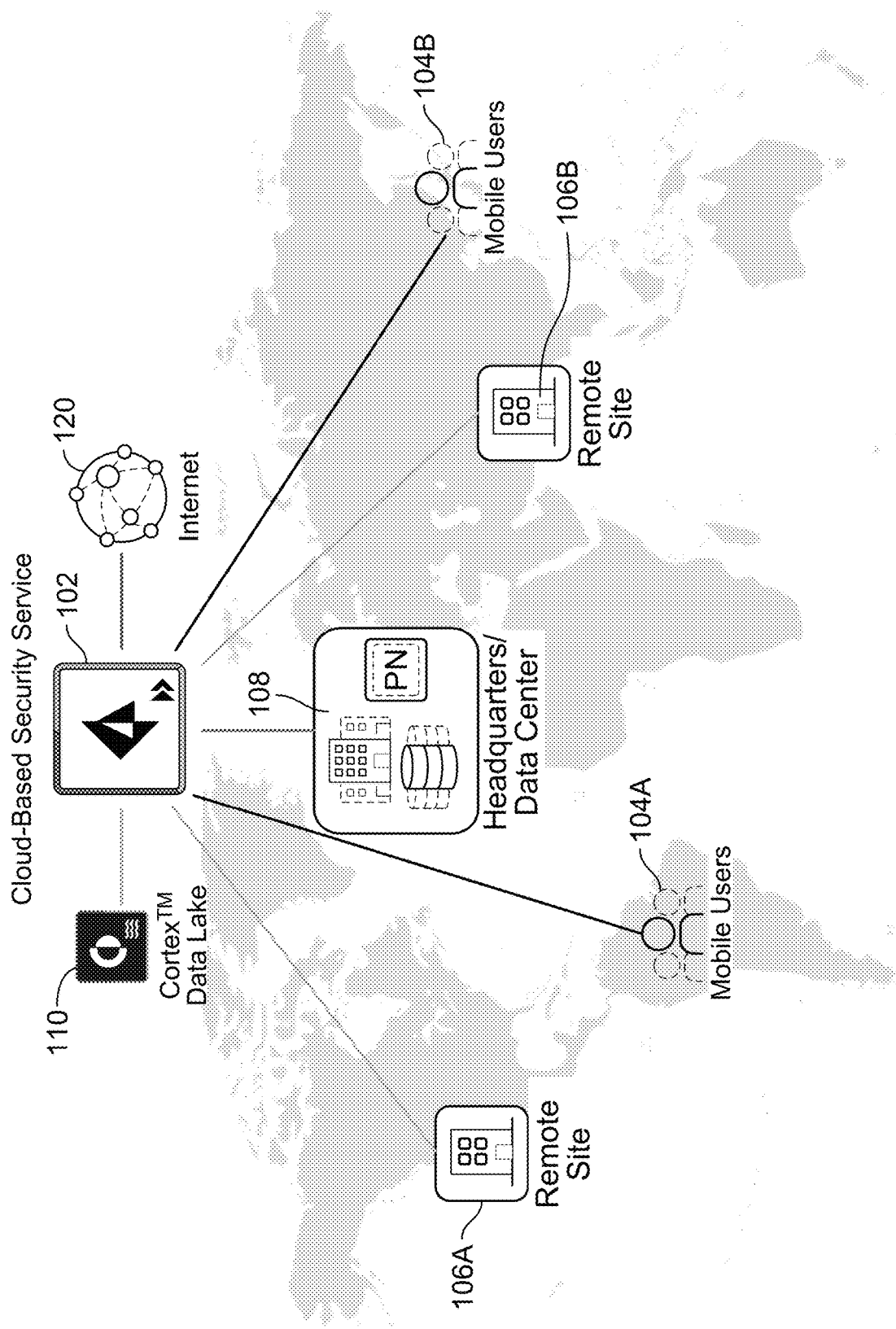
FIG. 1 is a system diagram overview of an example cloud-based security service in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Advanced or Next Generation Firewalls

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices, and in some implementations, certain operations can be implemented in special purpose hardware, such as an ASIC or FPGA).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein). A firewall can also filter local network (e.g., intranet) traffic by similarly applying a set of rules or policies.

Security devices (e.g., security appliances, security gateways, security services, and/or other security devices) can perform various security operations (e.g., firewall, anti-malware, intrusion prevention/detection, proxy, and/or other security functions), networking functions (e.g., routing, Quality of Service (QOS), workload balancing of network related resources, and/or other networking functions), and/or other security and/or networking related operations. For example, routing can be performed based on source information (e.g., IP address and port), destination information (e.g., IP address and port), and protocol information (e.g., layer-3 IP-based routing).

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using Hyper-Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls).

For example, Palo Alto Networks' next generation firewalls enable enterprises to identify and control applications, users, and content—not just ports, IP addresses, and packets—using various identification technologies, such as the following: App-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provides higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' firewalls, which support various commercial virtualized environments, including, for example, VMware® ESXi™ and NSX™, Citrix® Netscaler SDX™ KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

In some embodiments, a system/method/computer program product for detecting malicious uniform resource locators in network traffic includes routing network traffic from a client over a security access network provider virtual private network (VPN) access to a customer network, and enforcing symmetric routing crossing an autonomous system (AS) based on one or more prepended AS routing numbers in a first routing table for inbound traffic and/or based on one or more weights and one or more local preferences in a second routing table for outbound traffic.

In some embodiments, the enforcing of the symmetric routing crossing the AS includes identifying a first route having the highest weight based on the second routing table for outbound traffic, determining whether the first route having the highest weight is available, and in response to a determination that the first route having the highest weight is unavailable, selecting a second route having the highest local preference based on the second routing table.

In some embodiments, the enforcing of the symmetric routing crossing the AS further includes in response to a determination that the first route having the highest weight is available, selecting the first route.

In some embodiments, the enforcing of the symmetric routing crossing the AS includes identifying a first route having a shortest AS path based on the first routing table for inbound traffic, determining whether the first route having the shortest AS path is available, and in response to a determination that the first route having the shortest AS path is unavailable, selecting a second route having the next shortest AS path based on the second routing table.

In some embodiments, the enforcing of the symmetric routing crossing the AS further includes in response to a determination that the first route having the shortest AS path is available, selecting the first route.

In some embodiments, the AS includes at least one node on the security access network provider VPN and at least one node on the customer network.

In some embodiments, the security access network provider virtual private network (VPN) access is clientless or client-based.

In some embodiments, a primary route is assigned the highest weight in the second routing table.

In some embodiments, a backup route is assigned the highest local preference in the second routing table.

In some embodiments, a primary route is assigned the highest weight in the second routing table, and a backup route is assigned the highest local preference in the second routing table.

In some embodiments, one or more AS routing numbers are prepended to a non-primary route in the first routing table.

FIG. 1 is a system diagram overview of an example cloud-based security service in accordance with some embodiments. In this example cloud-based security service shown at 102, various mobile users 104A and 104B, remote sites 106A and 106B (e.g., to secure remote network locations, such as branch offices and remote networks, and users in those branches with cloud-based next-generation firewalls), as well as a headquarters/data center 108 of an enterprise customer(s) are in communication with the cloud-based security service. A data store 110 (e.g., a Cortex™ Data Lake or another data store solution) is also in communication with the cloud-based security service for storing various logs and/or other information for the cloud-based security service.

For example, the cloud-based security service can provide various firewall, VPN (e.g., establishing IPsec tunnels using one or more IP address pools to allow the service to assign IP addresses for the client VPN tunnels to facilitate secure communication between, for example, internal resources in the customer's enterprise network, the enterprise customer's mobile users, and users in their remote network/site locations), and other security related services for the mobile users, remote sites, and headquarters/data center based on policies (e.g., security policies configurable by the enterprise customer), such as for secure access to web sites/services (e.g., including SaaS provider services) on the Internet shown at 120.

Figure 2A:
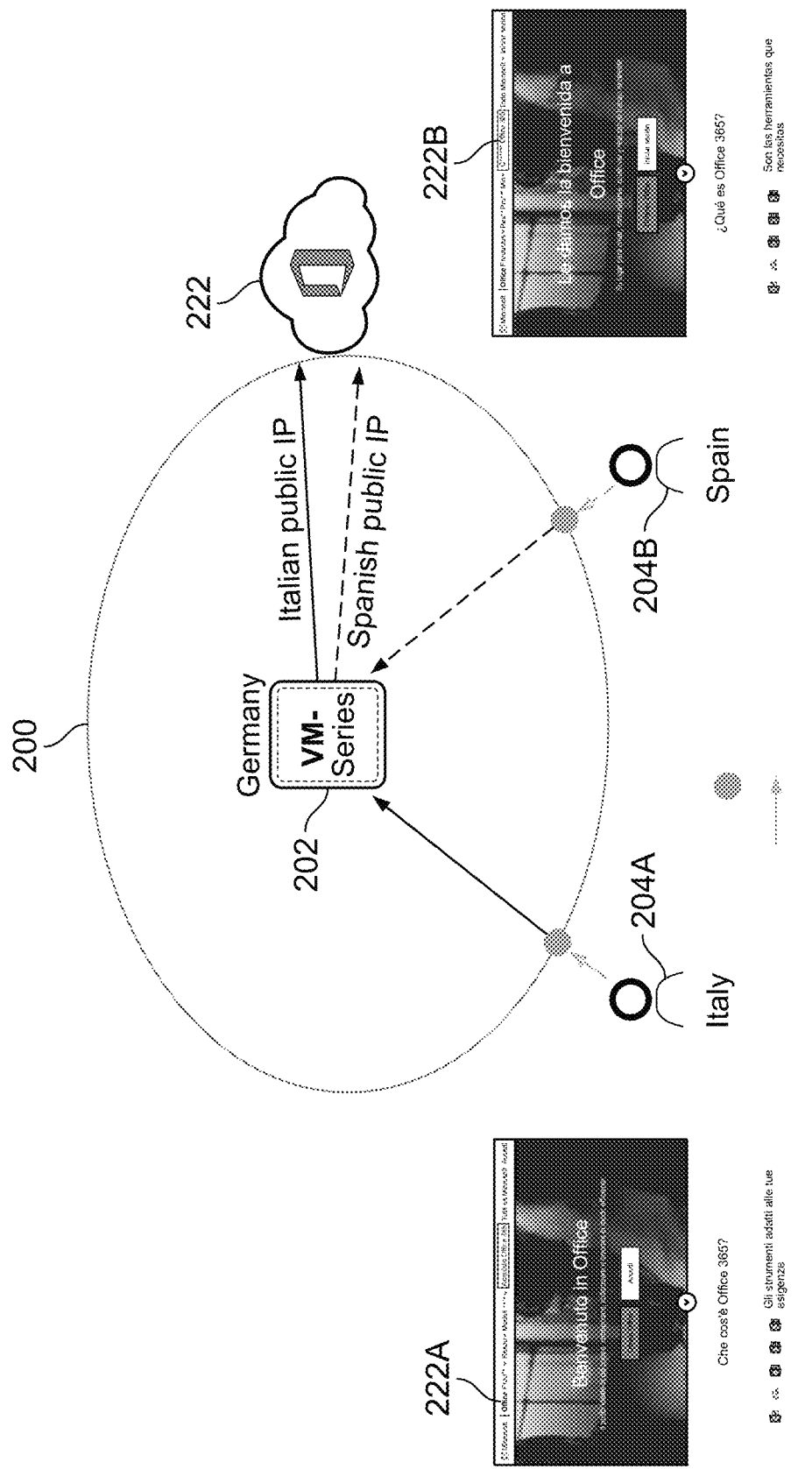
FIG. 2A is a system diagram of an example cloud-based security service in accordance with some embodiments.

FIG. 2A is a system diagram of an example cloud-based security service in accordance with some embodiments. For example, a cloud-based security service 200 can be implemented using a commercially available public cloud solution, such as the Google Cloud Platform (GCP), to facilitate a low latency for supported SaaS providers (e.g., Microsoft Office 365® as shown and/or other supported SaaS providers, such as Salesforce®, etc.) as well as implementing the disclosed techniques for an enhanced local experience for users of the cloud-based security service when they are connecting to web sites/services on the Internet including such SaaS provider solutions available on the Internet. As will be apparent to one of ordinary skill in the art, the disclosed techniques can similarly be implemented using public cloud solutions that are commercially available from other public cloud service providers, a combination of various public cloud service providers, or also by using regional data centers maintained/controlled by the cloud-based security service provider, or any combination thereof.

Referring to FIG. 2A, a network gateway 202 of cloud-based security service 200 is implemented as a virtual network gateway 202 (e.g., a security platform, such as a firewall solution available from Palo Alto Networks, Inc., or another commercially available security platform solution can similarly be configured to implement the network gateway as disclosed herein) executing on a server in a data center. In this example, the network gateway is executed on a server in a data center of the GCP located in Germany. A user 204A, who is located in Italy, is securely connected (e.g., via an IPsec tunnel or another secure/Virtual Private Network (VPN) connection) to network gateway 202 that is located in Germany (e.g., the cloud-based security service provides an agent that is executed on the endpoint device of user 204A to automatically and securely connect the user to the nearest regional network gateway, in which the enterprise customer can, for example, select locations in the cloud-based security service that function as cloud-based network gateways to secure their mobile users, such as will be further described below). Similarly, a user 204B, who is located in Spain, is securely connected to network gateway 202 that is located in Germany. In an example implementation, the cloud-based security service also provides an agent (not shown) (e.g., an endpoint agent, such as the GlobalProtect agent available from Palo Alto Networks, Inc.) that can be executed on various computing platforms such as the endpoint devices (e.g., endpoint devices executing various Operating Systems (OSs), such as Linux OS, Microsoft Windows® OS, Apple Mac OS®, Apple IOS®, and Google Android® OS) of users 204A and 204B (e.g., as well as of other users and data appliances, servers, etc.) that facilitates such automatic and secure connections to the nearest gateway and/or based on other criteria (e.g., latency, workload balancing, etc.).

As shown in FIG. 2A, using the disclosed techniques, network gateway 202 automatically performs a Source NAT (SNAT) operation to assign an Italian public IP address (e.g., a public IP address that is associated with the geo location of Italy) as the egress IP address to be associated with the session for user 204A when connecting with the Microsoft Office 365® service shown at 222. Similarly, network gateway 202 automatically performs a SNAT operation to assign a Spanish public IP address (e.g., a public IP address that is associated with the geo location of Spain) as the egress IP address to be associated with the session for user 204B when connecting with the Microsoft Office 365® service shown at 222.

As shown at 222A and 222B, users 204A and 204B of the cloud-based security service can connect through network gateway 202 to access various SaaS applications, such as Microsoft Office 365® (e.g., and/or other Internet web sites/services), and such will be rendered/provided in the local language associated with each user's respective location as a result of the above-described SNAT operations performed by network gateway 202 (e.g., absent such SNAT operations, the SaaS applications such as Microsoft Office 365® would infer that the users are located in Germany based on the public IP address(es) associated with network gateway 202 that is located in Germany (e.g., a public IP address(es) that is associated with the geo location of Germany), which would not provide a desirable user localization experience).

Moreover, the public cloud provider, GCP in this example, provides high-speed network connectivity from each of their various regional cloud-based computing service data centers to one or more SaaS providers including Microsoft Office 365® (e.g., using the GCP premium network that utilizes Google owned fiber network connections from their regional cloud platform sites to various SaaS provider sites). As a result, users 204A and 204B of cloud-based security service 200 would also experience a lower latency when connecting to network gateway 202 to access such SaaS provider solutions (e.g., Microsoft Office 365®) thereby further enhancing the user experience when using the SaaS provider solution securely via the cloud-based security service.

Figure 2B:
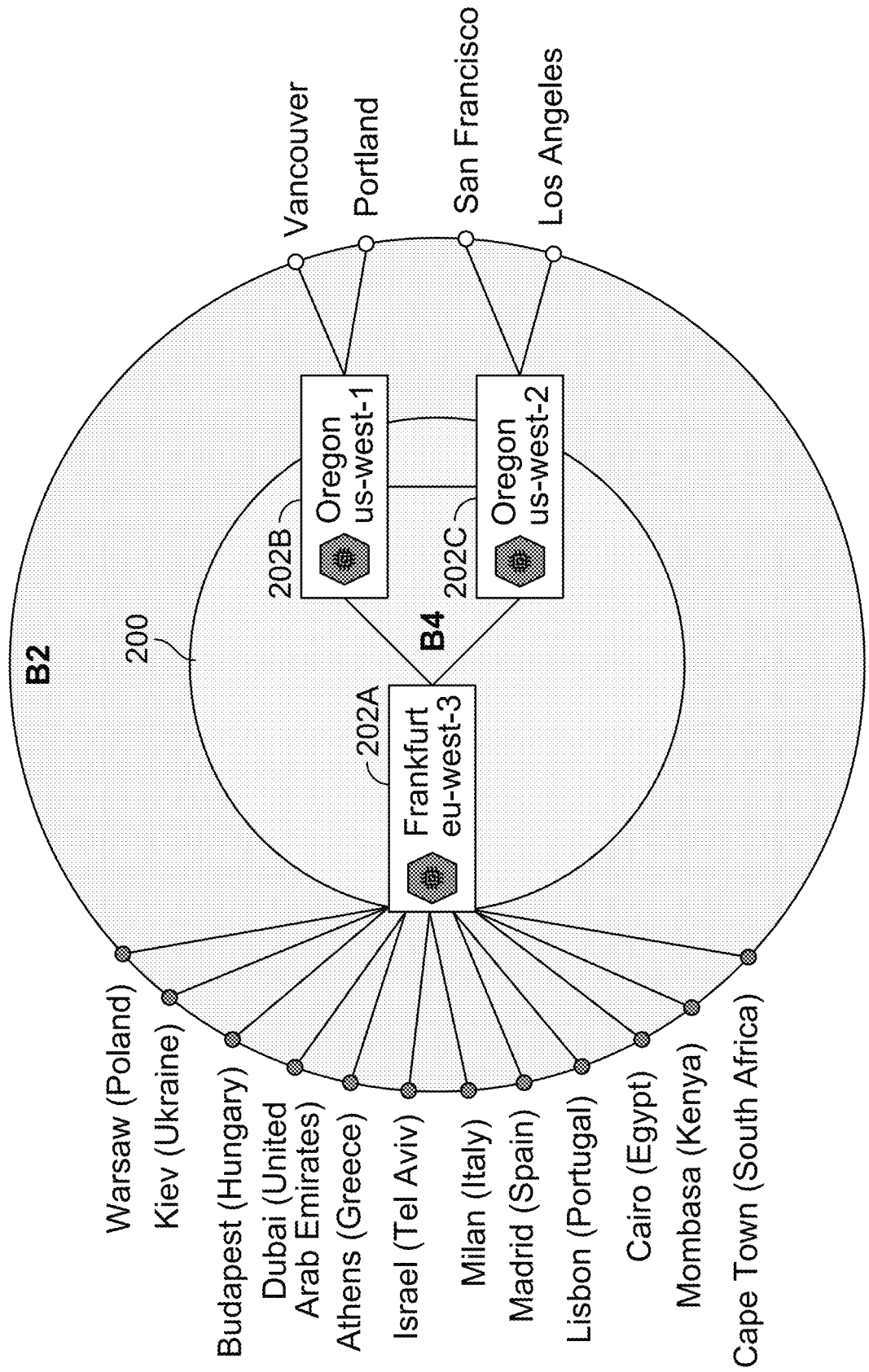
FIG. 2B is another system diagram of an example cloud-based security service in accordance with some embodiments.

FIG. 2B is another system diagram of an example cloud-based security service in accordance with some embodiments. In this example, network gateways 202A, 202B, and 202C of a cloud-based security service 200 are located in different geo locations as shown. As also shown, users of the cloud-based security service that are each located in different locations/regions can be automatically and securely connected to a network gateway of the cloud-based security service provider, such as further described below. For example, users located in Warsaw (Poland) are connected to a network gateway 202A in an eu-west-3 data center located in Frankfurt, Germany; users located in Vancouver, Canada are connected to a network gateway 202B in a us-west-1 data center located in Oregon, United States; and users located in San Francisco, CA are connected to a network gateway 202C in a us-west-2 data center also located in Oregon, United States. In an example implementation, the cloud-based security service can be implemented using a public cloud platform, such as GCP, that currently provides over 130 network edge locations (PoPs), and also provides for a low latency, low loss network with reduced Internet Service Provider (ISP) hops for users of the cloud-based security service to access various supported SaaS solutions as similarly described above.

In one embodiment, the disclosed network gateways (e.g., network gateway 202 of FIG. 2A and network gateways 202A-C of FIG. 2B) are configured to enforce policies (e.g., security policies) regarding communications between client devices and between client devices and servers/other devices, such as users/devices 204A and 204B (e.g., any endpoint device that can perform network communications) and, for example, external destinations (e.g., which can include any devices, servers, and/or web sites/services outside of a protected/secured enterprise network, which are reachable via an external network, such as the Internet). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers, etc. In some embodiments, the network gateway is also configured to enforce policies with respect to traffic that stays within a protected/secured enterprise network (not shown in FIGS. 2A and 2B).

Figure 3:
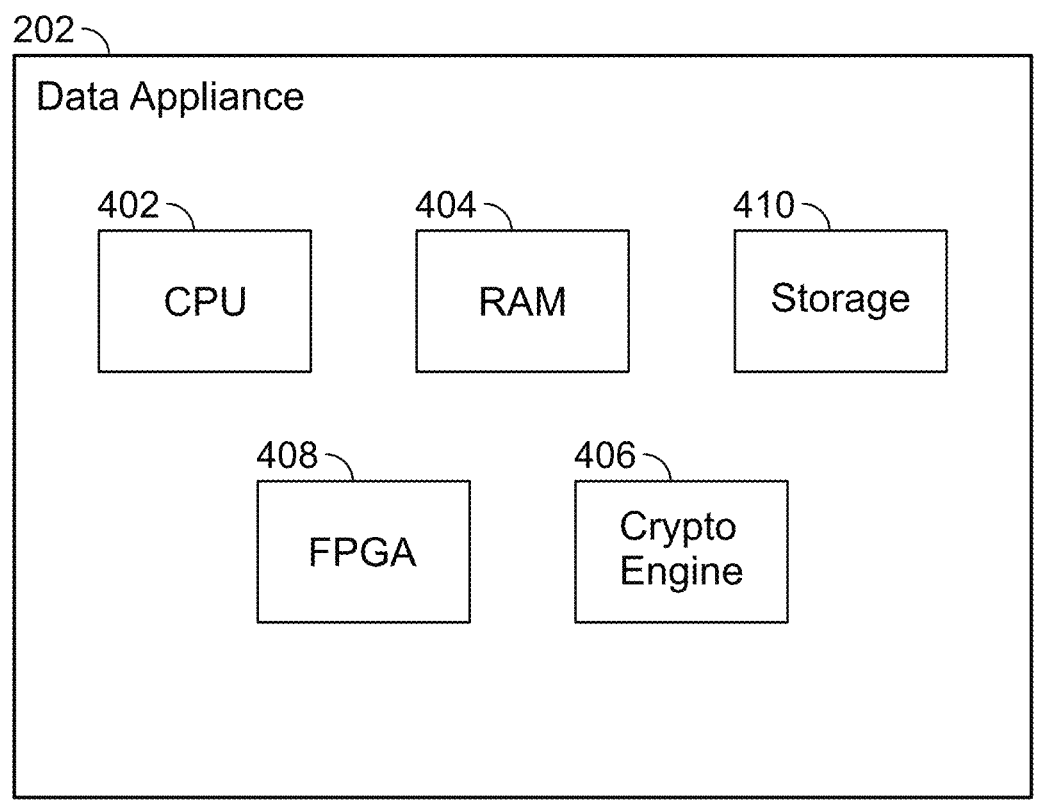
FIG. 3 illustrates an embodiment of a network gateway in accordance with some embodiments.

An embodiment of network gateway 202 is shown in FIG. 3. The example shown is a representation of physical components that can be included in network gateway 202 if the network gateway is implemented as a data appliance, in various embodiments. Specifically, the data appliance includes a high-performance multi-core Central Processing Unit (CPU) 402 and Random Access Memory (RAM) 404. The data appliance also includes a storage 410 (such as one or more hard disks or solid-state storage units). In various embodiments, the data appliance stores (whether in RAM 404, storage 410, and/or other appropriate locations) information used in monitoring an enterprise network and implementing the disclosed techniques. Examples of such information include application identifiers, content identifiers, user identifiers, requested URLs, IP address mappings, policy and other configuration information, signatures, hostname/URL categorization information, malware profiles, and machine learning models. The data appliance can also include one or more optional hardware accelerators. For example, the data appliance can include a cryptographic engine 406 configured to perform encryption and decryption operations, and one or more Field Programmable Gate Arrays (FPGAs) 408 configured to perform matching, act as network processors, and/or perform other tasks.

Functionality described herein as being performed by the data appliance can be provided/implemented in a variety of ways. For example, the data appliance can be a dedicated device or set of devices. The functionality provided by the data appliance can also be integrated into or executed as software on a general purpose computer, a computer server, a gateway, and/or a network/routing device. In some embodiments, at least some services described as being provided by the data appliance are instead (or in addition) provided to a client device (e.g., client device 204A) by software executing on the client device.

Whenever the data appliance is described as performing a task, a single component, a subset of components, or all components of the data appliance may cooperate to perform the task. Similarly, whenever a component of the data appliance is described as performing a task, a subcomponent may perform the task and/or the component may perform the task in conjunction with other components. In various embodiments, portions of the data appliance are provided by one or more third parties. Depending on factors such as the amount of computing resources available to the data appliance, various logical components and/or features of the data appliance may be omitted, and the techniques described herein adapted accordingly. Similarly, additional logical components/features can be included in embodiments of the data appliance as applicable. One example of a component included in the data appliance in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on.

The disclosed system processing architecture can be used with different types of clouds in different deployment scenarios, such as the following: (1) public cloud; (2) private cloud on-premises; and (3) inside high-end physical firewalls, and some processing power can be allocated to execute a private cloud (e.g., using the management plane (MP) in the Palo Alto Networks PA-5200 Series firewall appliances).

Figure 4:
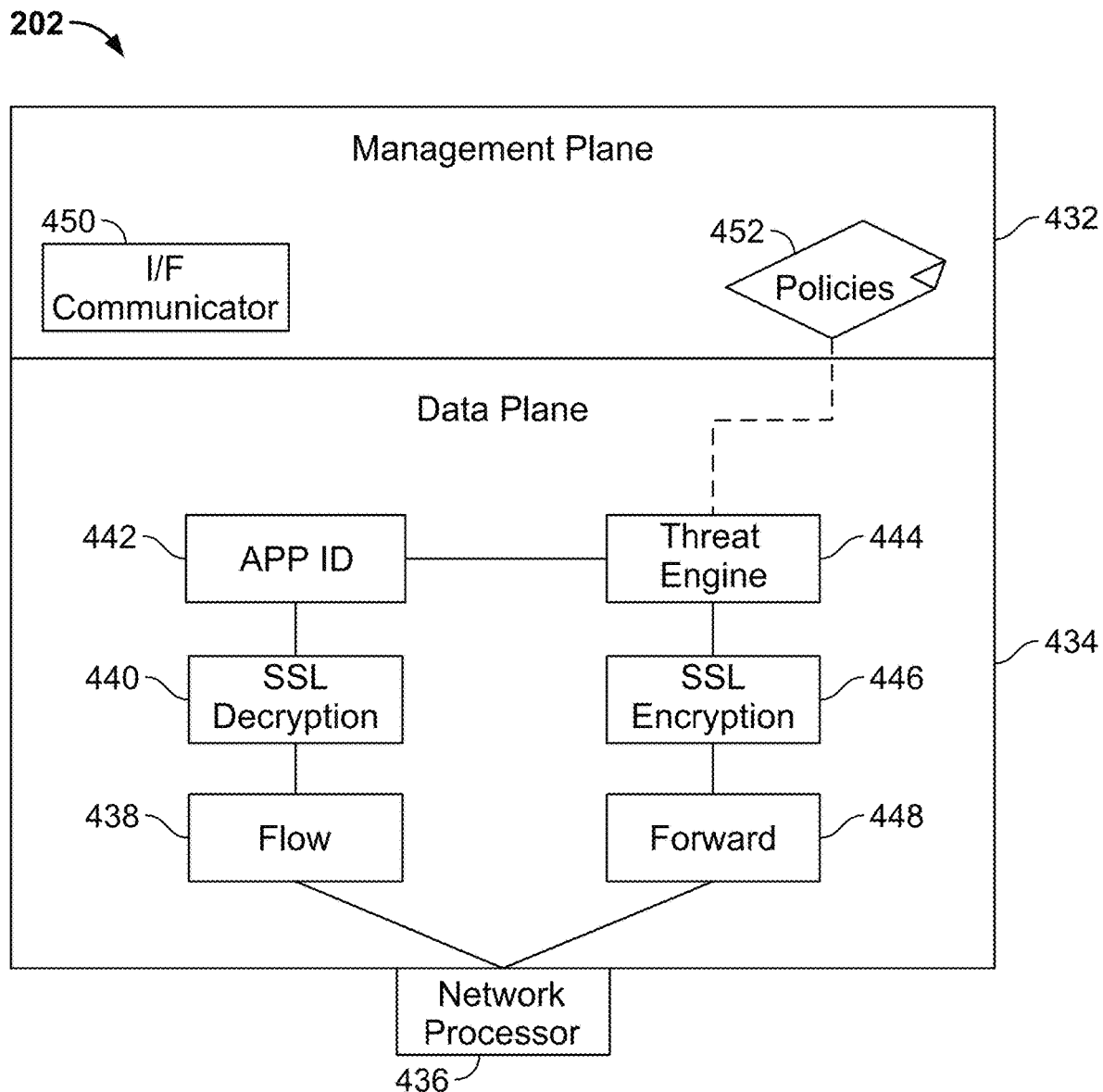
FIG. 4 is a functional diagram of logical components of an embodiment of a data appliance.

FIG. 4 is a functional diagram of logical components of an embodiment of a data appliance. The example shown is a representation of logical components that can be included in network gateway 202 in various embodiments. Unless otherwise specified, various logical components of network gateway 202 are generally implementable in a variety of ways, including as a set of one or more scripts (e.g., written in Java, python, etc., as applicable).

As shown, network gateway 202 comprises a firewall, and includes a management plane 432 and a data plane 434. The management plane is responsible for managing user interactions, such as by providing a user interface for configuring policies and viewing log data. The data plane is responsible for managing data, such as by performing packet processing and session handling.

Network processor 436 is configured to receive packets from client devices, such as client devices 204A and 204B, and provide them to data plane 434 for processing. Whenever flow module 438 identifies packets as being part of a new session, it creates a new session flow. Subsequent packets will be identified as belonging to the session based on a flow lookup. If applicable, SSL decryption is applied by SSL decryption engine 440. Otherwise, processing by SSL decryption engine 440 is omitted. Decryption engine 440 can help network gateway 202 inspect and control SSL/TLS and SSH encrypted traffic, and thus help to stop threats that might otherwise remain hidden in encrypted traffic. Decryption engine 440 can also help prevent sensitive content from leaving an enterprise/secured customer's network. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 442 is configured to determine what type of traffic a session involves. As one example, application identification engine 442 can recognize a GET request in received data and conclude that the session requires an HTTP decoder. In some cases, e.g., a web browsing session, the identified application can change, and such changes will be noted by network gateway 202. For example a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders.

Based on the determination made by application identification engine 442, the packets are sent, by threat engine 444, to an appropriate decoder configured to assemble packets (which may be received out of order) into the correct order, perform tokenization, and extract out information. Threat engine 444 also performs signature matching to determine what should happen to the packet. As needed, SSL encryption engine 446 can re-encrypt decrypted data. Packets are forwarded using a forward module 448 for transmission (e.g., to a destination).

As also shown in FIG. 4, policies 452 are received and stored in management plane 432. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 450 is provided for management communications (e.g., via (REST) APIs, messages, or network protocol communications or other communication mechanisms).

Figure 5:
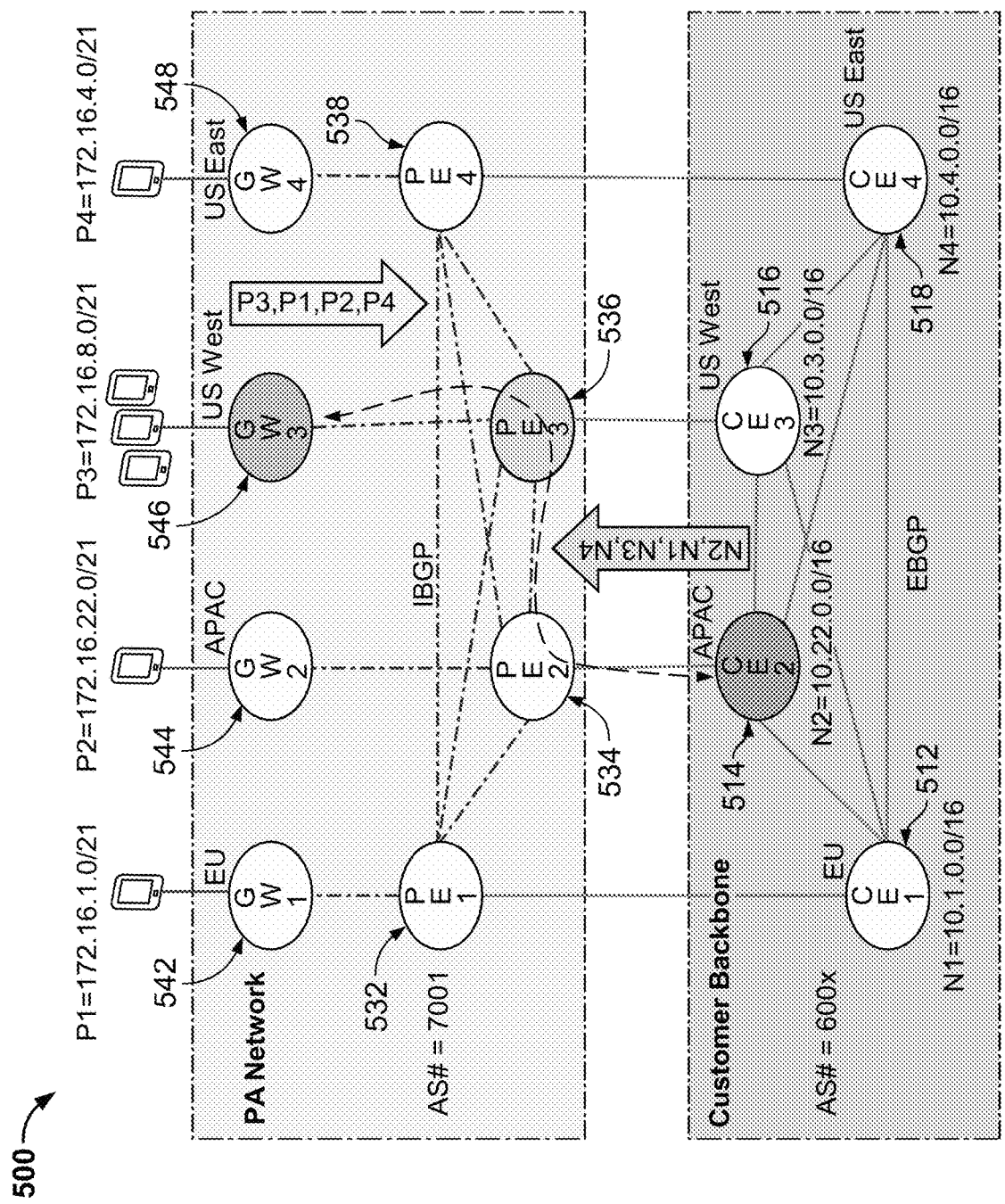
FIG. 5 is a system diagram of an example of a network topology of a customer backbone network including a client virtual private network.

FIG. 5 is a system diagram of an example of a network topology of a customer backbone network including a client virtual private network.

In the example, the customer backbone network 500 utilizes a fully meshed External Border Gateway Protocol (EBGP) and includes various customer edge (CE) devices. In this example, the CE devices include CE1 512, CE2 514, CE3 516, and CE4 518. Each CE device is located in a data center. In some embodiments, the data center is a physical facility that organizations use to house their critical applications and data, and the data center includes a network of computing and storage resources that enable the delivery of shared applications and data. In some embodiments, components of the data center include routers, switches, firewalls, storage systems, servers, and application-delivery controllers. In some embodiments, a CE device is the default gateway in a geolocation to route traffic in and out of the data center. As an example, CE1 512 is located in an Eastern Europe DC1, CE2 514 is located in an Asia-Pacific (APAC) DC2, CE3 516 is located in a US-West DC3, and CE4 518 is located in a US-East DC4. Each data center has a corresponding autonomous system (AS) number. For example, the Eastern Europe DC1 has an AS number 6001, the APAC DC2 has an AS number 6002, the US-West DC3 has an AS number 6003, and the US-East DC4 has an AS number 6004. Each customer edge device has its own network subnet. For example, CE1 512 has network one (N1=10.1.0.0/16), CE2 514 has network two (N2=10.22.0.0/16), CE3 516 has network three (N3=10.3.0.0/16), and CE4 518 has network four (N4=10.4.0.0/16). All of the networks from the customer side are advertised to the provider via EBGP. Thus, a link between PE2 and CE2 is an EBGP connection. The provider edge includes PE1 532, PE2 534, PE3 536, and PE4 538, and the PEs and the corresponding CEs are connected by EBGP connections. The PEs are also fully meshed via an internal border gateway protocol (iBGP). The gateways (GWs) include GW1 542, GW2 544, GW3 546, and GW4 548 that allow the mobile user (MU) network access. The MU, e.g., the iPhone or many iPhones can be attached to a single gateway. As shown, different iPhones are attached to different GWs, and each MU will have its own IP pool prefix. For example, GW3 546 corresponds with PE3 536, GW2 544 corresponds with PE2 534, etc. As an example, GW1 542 to PE1 532 will be an IBGP connection, GW2 544 to PE2 534 will be another IBGP connection, GW3 546 to PE3 536 will be another IBGP connection, and GW4 548 to PE4 538 will be another IBGP connection.

As an example, the internal network of a provider network uses IBGP, and the internal network of a customer backbone network uses EBGP, and in between the provider network and the customer backbone network, EBGP connections exist.

The roundtrip traffic originates from an MU and goes to CE1 512, or from the same MU to CE2 514, to CE3 516, or to CE4 518. In other words, the same MU can go to any data center (DC) via the closest PE. Also, this scenario applies to other MUs attached to other GWs 540. In this scenario, the MU is running a client virtual private network (VPN) program such as global protect. As an example, the MU P3 is attached to GW3 546 and sends traffic to CE2 514, and also traffic returns to MU P3 via the same GW3 546.

Figure 6:
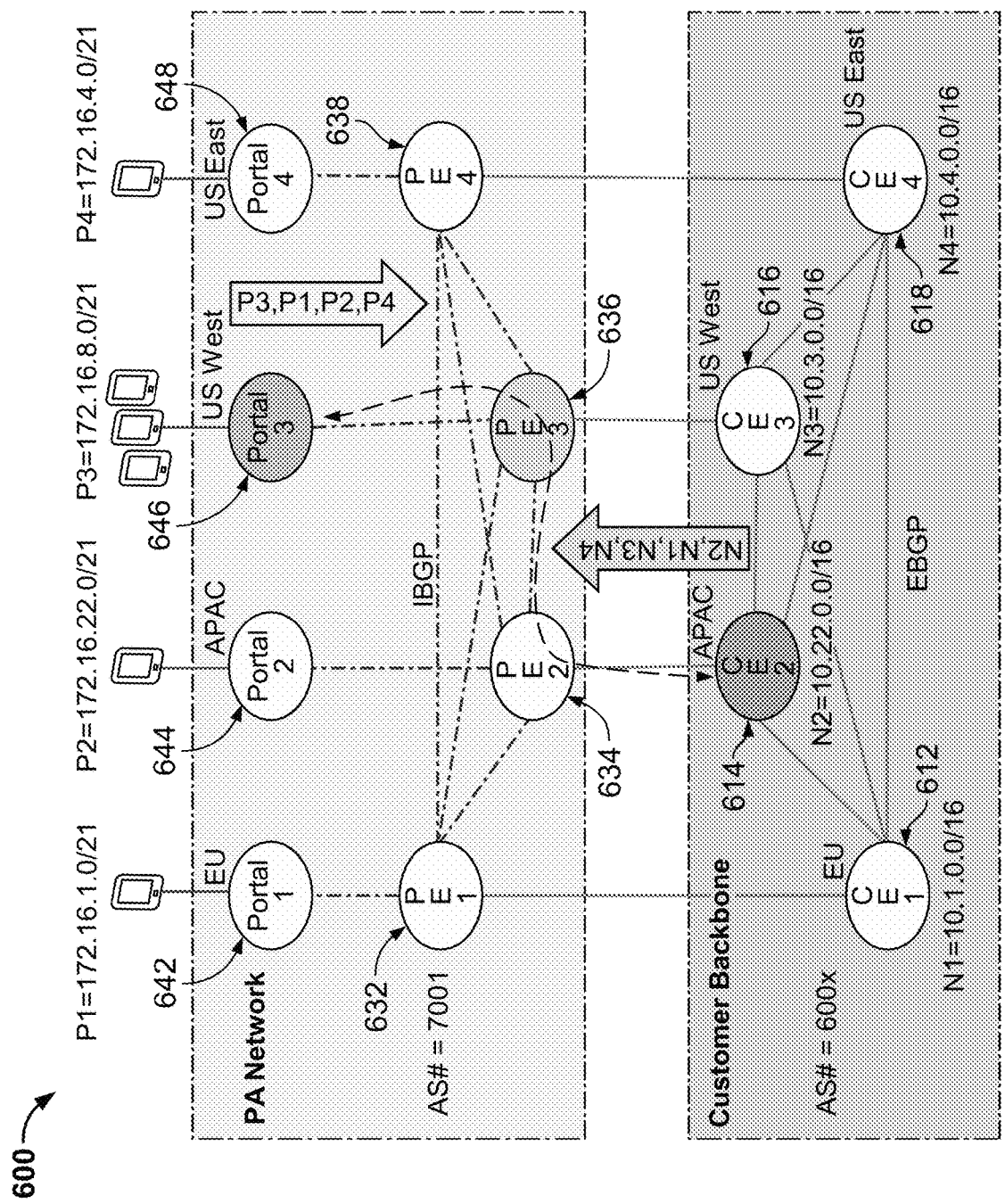
FIG. 6 is a system diagram of an example of a network topology of a customer backbone network including a clientless virtual private network.

FIG. 6 is a system diagram of an example of a network topology of a customer backbone network including a clientless virtual private network.

In this example, the customer backbone network 600 corresponds with the customer backbone network 500 of FIG. 5. Also, portal1 642, portal2 644, portal3 646, and portal4 648 correspond with GW1 542, GW2 544, GW3 546, and GW4 548 of FIG. 5, respectively, PE1 632, PE2 634, PE3 636, and PE4 638 correspond with PE1 532, PE2 534, PE3 536, and PE4 538 of FIG. 5, respectively, and CE1 612, CE2 614, CE3 616, and CE4 618 correspond with CE1 512, CE2 514, CE3 516, and CE4 518 of FIG. 5, respectively.

In the customer backbone network 600, the mobile users (MU) are on a clientless virtual private network (VPN). In other words, the MUs are not running a client VPN program. The difference between clientless VPN and client VPN is, in FIG. 5, the portals 642, 644, 646, and 648 are called gateways (GWs) 542, 544, 546, and 548 instead, and links between the MU and the portals 642, 644, 646, and 648 do not use secure IP (IPsec), but instead use a Secure Sockets Layer (SSL).

Figure 7:
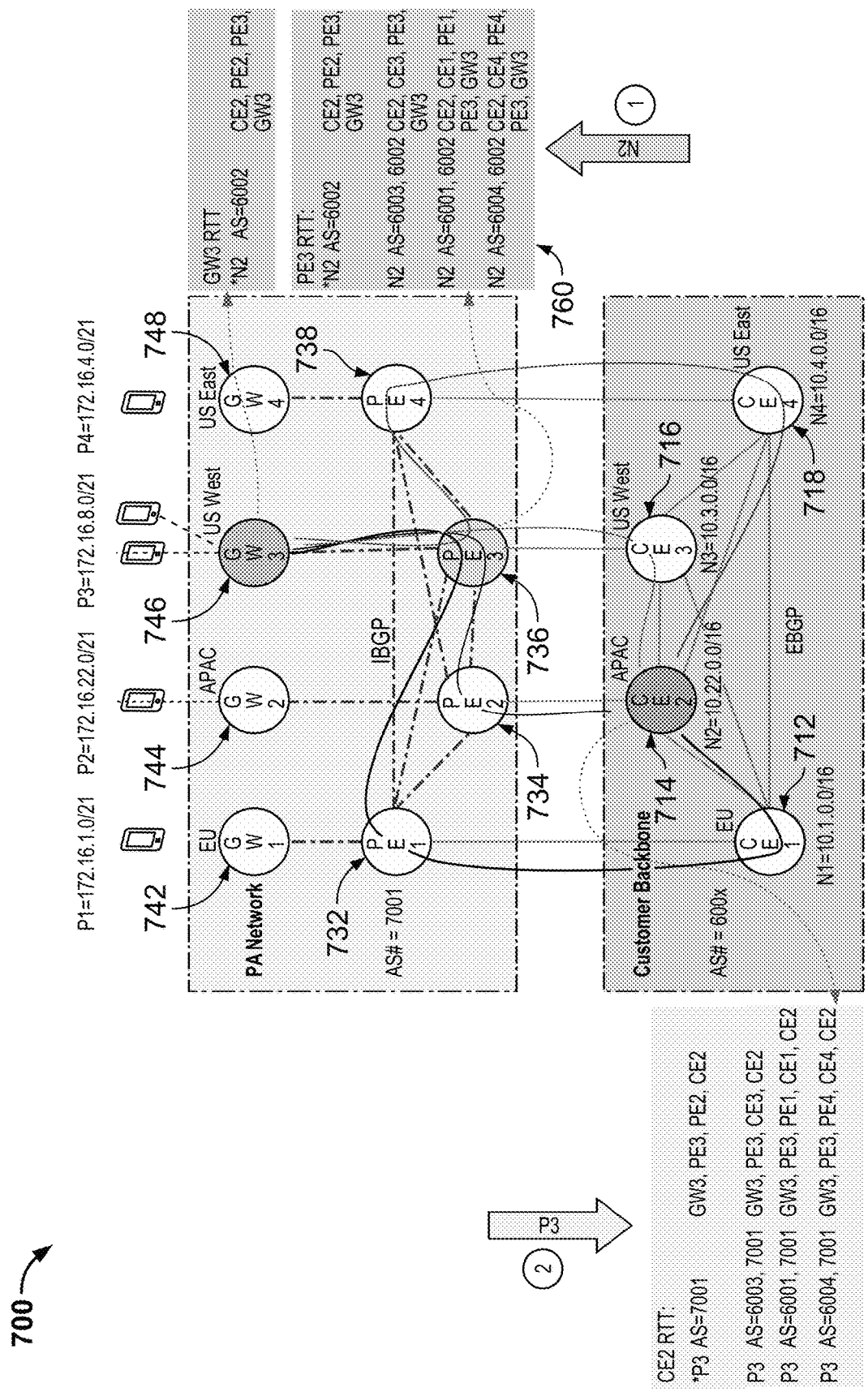
FIG. 7 is a system diagram of an example of a network topology of a customer backbone network including a customer edge device connected to a backup provider edge.

FIG. 7 is a system diagram of an example of a network topology of a customer backbone network including a customer edge device connected to a backup provider edge.

In this example, the customer backbone network 700 corresponds with the customer backbone network 500 of FIG. 5. In some embodiments, GW1 742, GW2 744, GW3 746, and GW4 748 correspond with GW1 542, GW2 544, GW3 546, and GW4 548 of FIG. 5, respectively, PE1 732, PE2 734, PE3 736, and PE4 738 correspond with PE1 532, PE2 534, PE3 536, and PE4 538 of FIG. 5, respectively, and CE1 712, CE2 714, CE3 716, and CE4 718 correspond with CE1 512, CE2 514, CE3 516, and CE4 518 of FIG. 5, respectively.

As an example, in the customer backbone network 700, a packet from an MU linked to GW3 746 has a destination of a data center associated with CE2 714. In the example, the MU sends traffic via route N2 which is located in the data center associated with CE2 714 and the data center uses CE2 714 as its gateway for forwarding traffic in and out of the data center's networks. Typically, by default, the BGP selects the best path which has the shortest AS path length. As shown, the best path is from GW3 746 to PE3 736, to PE2 734, and to CE2 714. Furthermore, in reverse, the best path from the data center follows the reverse route going from CE2 714 to PE2 734 to PE3 736 to GW3 746, and back to the mobile user. As an aspect, this path traverses the provider network via "cold potato routing" instead of "hot potato routing." "Hot potato routing" requires network traffic to exit the provider network as quickly as possible.

In this example, as a first problem, if "hot potato routing" is implemented, the selected path of the packet should not go through two gateways to leave the provider network, which is longer than the shortest path of one gateway on the provider network. Therefore, the route selected using "hot potato routing" is not the shortest path to exit the provider network. Instead, the BGP routing uses "cold potato routing" because the shortest path to leave the provider network is not selected. In cold potato routing, an ISP or a provider network carries traffic as far as possible on its own network until the traffic is as near to the destination as possible before handing off the traffic to another AS. On the contrary, in hot potato routing, an ISP or a provider network passes traffic to another AS as quickly as possible at its shortest exit point.

A second problem is illustrated when the link between PE2 734 and CE2 714 goes down. In the CE2 routing table 750, the shortest AS path is unavailable, and of the remaining three AS paths, each AS path has an equal AS path length, which is a length of two. Thus, the remaining AS paths have the same AS path length. As a result, for the BGP best path selection, when you have multiple paths having the same lengths, the tiebreaker is the router ID (e.g., largest router ID or smallest router ID is selected). In some embodiments, BGP selects the path having the smallest router ID. In some embodiments, BGP selects the path having the largest router ID. However, router IDs can be assigned arbitrarily, so the path selection is essentially random. For example, from CE2's point of view, the CE2 714 sending data to an MU sends packets via CE1 712 to PE1 732, and to PE3 736, but from PE3's point of view, since the path between PE2 734 and CE 2 714 is unavailable or down, PE3 736 randomly selects one of the three remaining paths found in routing table 760 of PE3 736. Typically, path selection and traffic flow in opposite directions. For example, traffic flowing from MU to CE2 flows in a client-to-server direction, and traffic flowing from CE2 to MU flows in a server-to-client direction. From the point of view of PE3 736, traffic received from CE2 714 is inbound, and traffic sent to CE2 714 is outbound. For example, PE3 736 sends packets via CE3 716 and then to CE1 712. Accordingly, for outbound traffic, CE1 712 sends packets to PE1 732, and to PE3 736 but receives packets from PE3 736 via CE3 716 and then to CE1 712.

In this scenario, asymmetric routing happens. As a result, any firewall (CE1 712, CE3 716, PE1 732, or PE3 736)

along the path (on the customer side or the provider side) will drop the packets. Because when the Client to Server (C2S) traffic and returning Server to Client (S2C) traffic do not flow along the same path, a TCP sync mismatch will occur or a symmetric path will not be satisfied, and since firewalls are stateful, the traffic will be dropped. As a result, the traffic is not going to reach its destination and come back to the MU.

Cold potato routing is the opposite of hot potato routing. For cold potato routing, a packet will stay in the provider network, as long as needed, but sends the traffic forward to the destination at the closest exit to the destination. However, a packet can traverse extra firewalls in the provider network, which is the opposite to hot potato routing. On the other hand, in hot potato routing, packets exit the provider network (e.g., GWs and PEs) as soon as possible, and traffic can traverse extra hops in the customer network (e.g., CEs). Hot potato routing favors the customer network, and the cold potato routing favors the provider network. In this scenario, for hot potato routing, packets will leave the provider network via PE3 736.

For the second problem, when a firewall determines that network traffic is not symmetric and instead has two separate sessions, and if your two separate sessions' packets do not match, the firewall will drop the packet. Also, the firewall requires symmetric routing paths.

Figure 8:
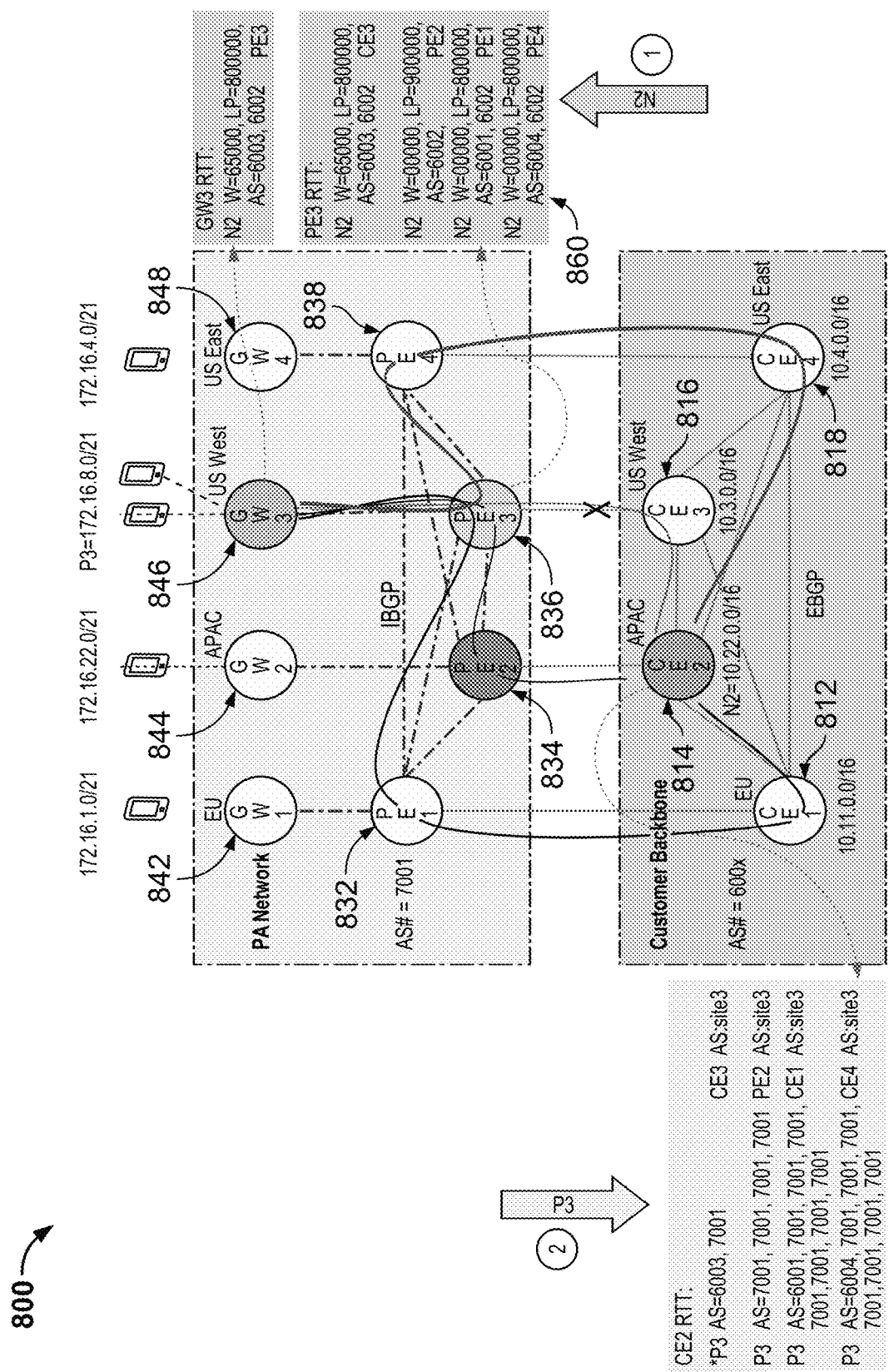
FIG. 8 is a system diagram of another example of a network topology of a customer backbone network including a customer edge device connected to a backup provider edge.

FIG. 8 is a system diagram of another example of a network topology of a customer backbone network including a customer edge device connected to a backup provider edge.

In this example, the customer backbone network 800 corresponds with the customer backbone network 500 of FIG. 5. In some embodiments, GW1 842, GW2 844, GW3 846, and GW4 848 correspond with GW1 542, GW2 544, GW3 546, and GW4 548 of FIG. 5, respectively, PE1 832, PE2 834, PE3 836, and PE4 838 correspond with PE1 532, PE2 534, PE3 536, and PE4 538 of FIG. 5, respectively, and CE1 812, CE2 814, CE3 816, and CE4 818 correspond with CE1 512, CE2 514, CE3 516, and CE4 518 of FIG. 5, respectively.

For customer backbone network 800, to make sure the gateways are implementing hot potato routing so that symmetric routing is implemented from end to end, crossing the autonomous system, a backup PE is designated for each primary PE. For MU P3 connected to GW3 846, GW3 846 selects the closest PE to connect with, and the closest PE will be its primary PE. In this case, PE3 836 is selected as the primary PE for GW3 846. In this case, GW3 846 connects with PE3 836 via IBGP, and PE3 836 is assigned a backup PE, which in this case is PE2 834.

In this case, the customer network N2, which is 10.22.0.0/16, follows CE2 812 and is advertised through EBGP to the provider PEs 832, 834, 836, and 838, and then advertised through IBGP to PE3 836. So PE3 836 will receive route N2 through multiple paths. In this example, the weight for primary path N2 received from CE3 816 via EBGP is raised to 65000 and for the other PEs, the weight is zero, as shown in the routing table 860. So, when PE3 836 selects a path, PE3 836 selects a path having the highest weight (e.g., 65000).

From an MU point of view, the gateway GW3 846 advertises a route or a prefix P3, which is 172.16.8.0/21, to PE3 836, and PE3 836 will advertise the prefix P3 directly to CE3 816 through EBGP, at the same time PE3 836 will advertise the prefix P3 to PE2 834, PE1 832, and PE4 838. And PE2 834, PE1 832, PE4 838 will advertise the prefix P3 to the customer network.

In this case the primary path has an AS number of 7001 for a total of one AS number, the backup path will prepend three more AS numbers than the primary path for a total of four AS numbers, and the non-backup paths (paths that are neither primary paths nor backup path) will prepend three more AS numbers than the backup path for a total of seven AS numbers. As an example, the non-backup paths include paths that 1) go through PE4 838 and CE4 818, or 2) go through PE1 832 and CE1 812. In this case, when CE2 814 selects the best path, the path going through PE3 836 to CE3 816 is clearly the best path in both directions. Also, the path going through PE3 836 to CE3 816 satisfies hot potato routing requirements, because packets exit the provider network immediately and prefer the customer network.

In this case, when the link between PE3 836 and CE3 816 goes down in both directions, from PE3 836's point of view, as shown in PE3's routing table 860, PE3 836 then selects the path with the highest local preference (LP) as the best path. In this case, the path with the LP of 900000 is higher than the two other paths which both have LP values of 80000. So, the gateway (GW3 846) will send traffic to PE3 836, to PE2 834, and then to CE2 814.

From CE2 814's point of view, as shown in CE2 814's routing table 850, CE2 814 selects the path with the shortest AS path length, which includes CE2 814 to PE2 834, to PE3 836, and to GW3 846 and vice versa in the reverse direction. Unlike previous routing techniques that fell back to using router IDs which are randomly assigned, symmetrical routing is maintained in both directions. In other words, the path is deterministically determined.

For the inbound direction, the path is determined by weight and local preference for the backup path, so path selection is also deterministically determined. So, in this part, AS path length is no longer used to select the best path in the provider network at PE3 836.

In this case, the destination relates to a remote data center, e.g., CE3 816. CE3 816 is a local data center for GW3 846 and CE1 812, CE2 814, and CE4 818 are remote data centers with respect to GW3 846. Furthermore, CE2 814 is different from CE1 812 and CE4 818 in that CE2 814 is directly connected to a backup path and CE1 812 and CE4 818 are directly connected to non-backup paths (1) PE1 832 to CE1 812 and 2) PE4 838 to CE4 818, respectively.

Figure 9:
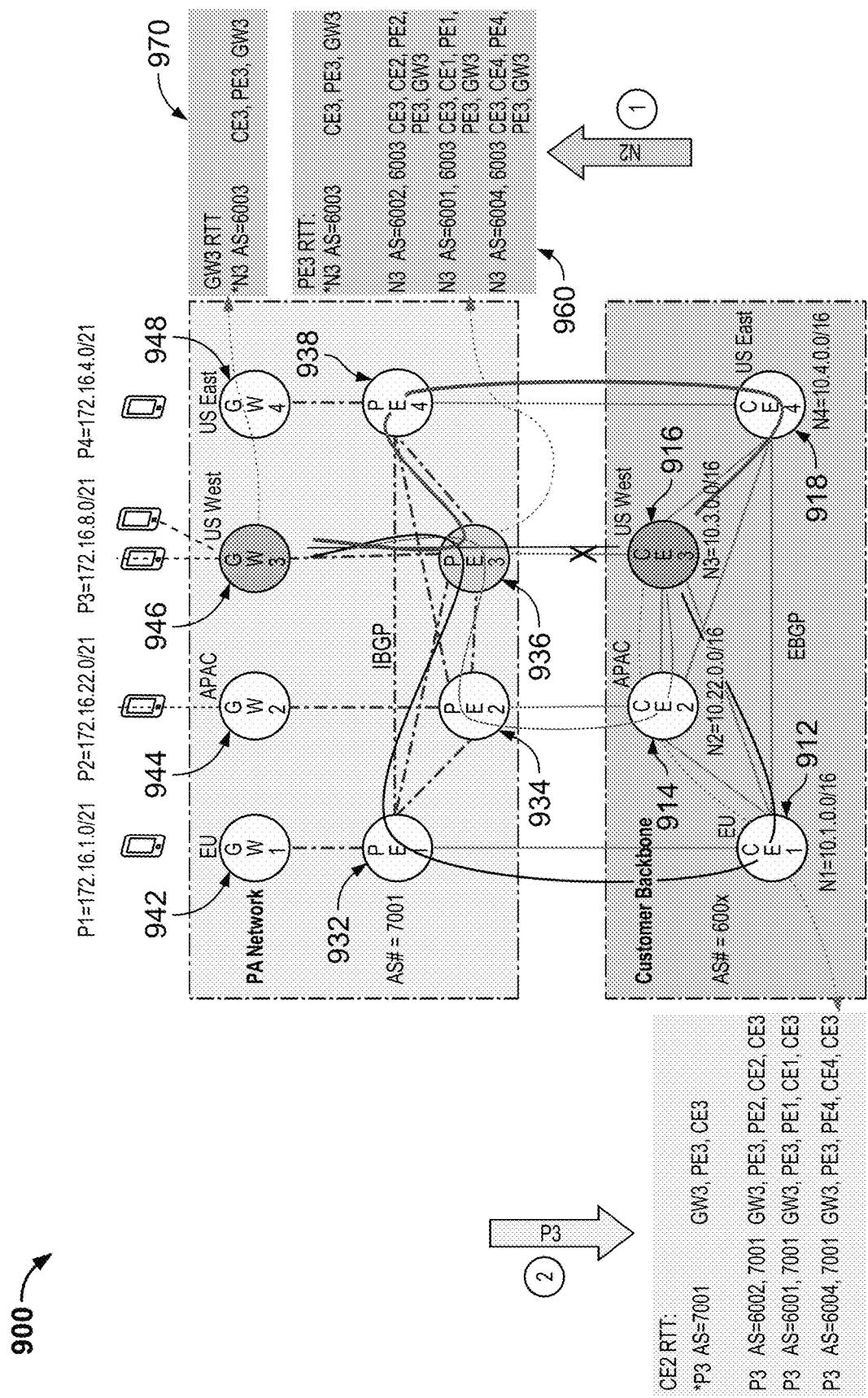
FIG. 9 is a system diagram of an example of a network topology of a customer backbone network including a customer edge device connected to a primary provider edge.

FIG. 9 is a system diagram of an example of a network topology of a customer backbone network including a customer edge device connected to a primary provider edge.

In this example, the customer backbone network 900 corresponds with the customer backbone network 500 of FIG. 5. In some embodiments, GW1 942, GW2 944, GW3 946, and GW4 948 correspond with GW1 542, GW2 544, GW3 546, and GW4 548 of FIG. 5, respectively, the PEs 932, 934, 936, and 938 correspond with PE1 532, PE2 534, PE3 536, and PE4 538 of FIG. 5, respectively, and CE1 912, CE2 914, CE3 916, and CE4 918 correspond with CE1 512, CE2 514, CE3 516, and CE4 518 of FIG. 5, respectively.

In customer backbone network 900, customer backbone network 900 includes a local data center CE3 916, which is directly attached to the PE3 936, which is the primary PE for GW3 946. In this case, according to the BGP best path selection criteria, the AS path having the shortest path length is the path including the primary link between PE3 936 and CE3 916 for CE3's routing table 950, PE3's routing table 960, and GW3's routing table 970.

Assume that the primary link between PE3 936 and CE3 916 goes down, and this was the best link between the provider network and the customer backbone network. All of the remaining paths in the routing tables 950 and 960 have the same AS path length. The same problem will happen in either direction where the tiebreaker is determined using the router ID, and that it is unlikely that the same path will be selected in both directions (for outbound traffic and for inbound traffic). Only if the same inbound path and the same outbound path are selected, no packets will be dropped. However, since the paths are selected at random for the outbound traffic and the inbound traffic, more likely than not, different paths will be selected for the outbound traffic and the inbound traffic. If different outbound and inbound paths are selected, then the asymmetric routing problem will occur and packets will be dropped.

Figure 10:
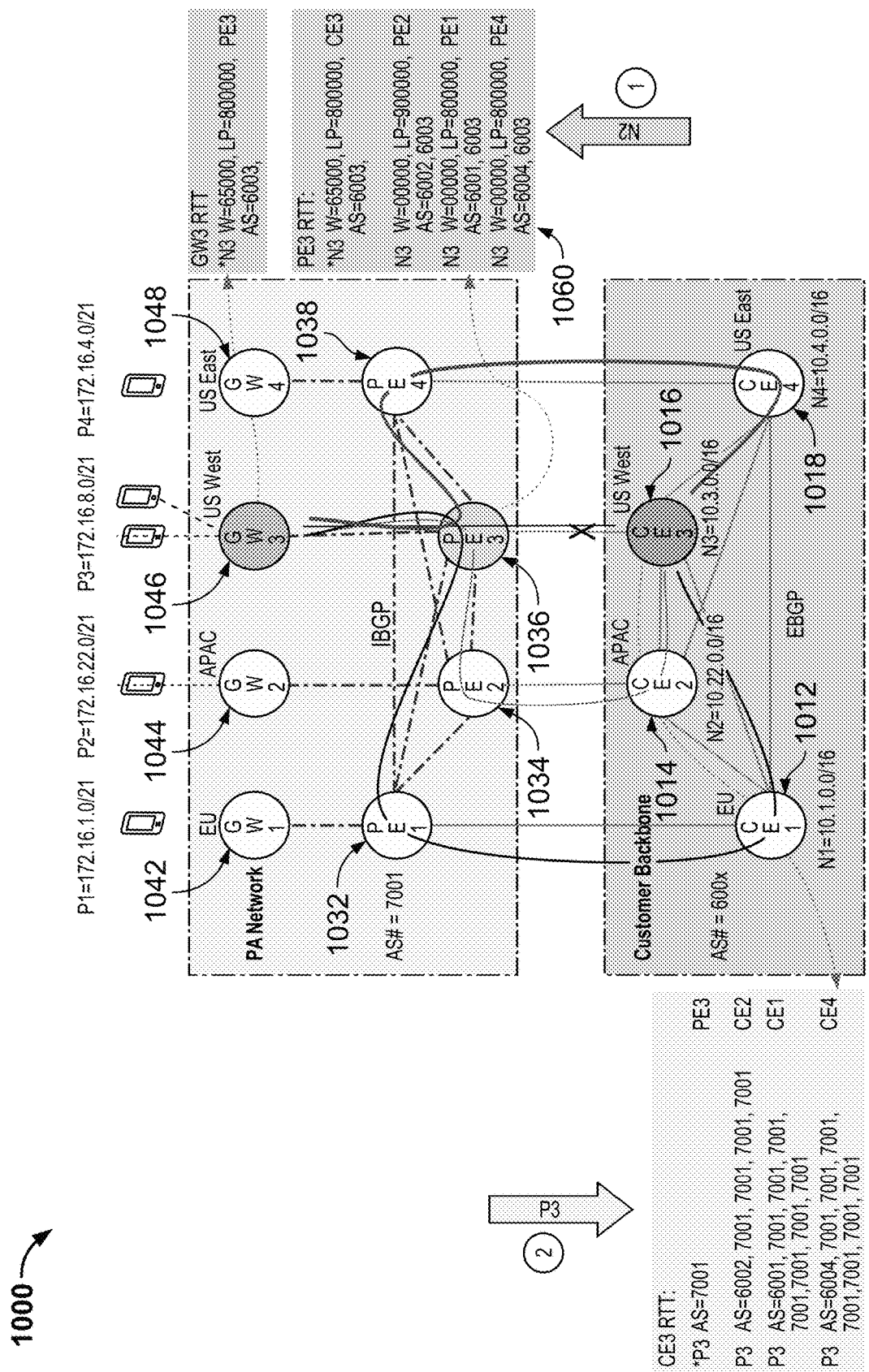
FIG. 10 is a system diagram of another example of a network topology of a customer backbone network including a customer edge device connected to a primary provider edge.

FIG. 10 is a system diagram of another example of a network topology of a customer backbone network including a customer edge device connected to a primary provider edge.

In this example, the customer backbone network 1000 corresponds with the customer backbone network 500 of FIG. 5. In some embodiments, GW1 1042, GW2 1044, GW3 1046, and GW4 1048 correspond with GW1 542, GW2 544, GW3 546, and GW4 548 of FIG. 5, respectively, PE1 1032, PE2 1034, PE3 1036, and PE4 1038 correspond with PE1 532, PE2 534, PE3 536, and PE4 538 of FIG. 5, respectively, and CE1 1012, CE2 1014, CE3 1016, and CE4 1018 correspond with CE1 512, CE2 514, CE3 516, and CE4 518 of FIG. 5, respectively.

To prevent an asymmetric routing problem from occurring after the primary path goes down, similar to the customer network backbone 900 of FIG. 9, in customer backbone network 1000, in the export direction, the AS path number is prepended to the backup path, and in the import direction, the backup path's weight and local preference are to be increased, as shown in PE3's routing table 1060; otherwise, all of the other routes in PE3's routing table 1060 have the same AS path length.

Figure 11:
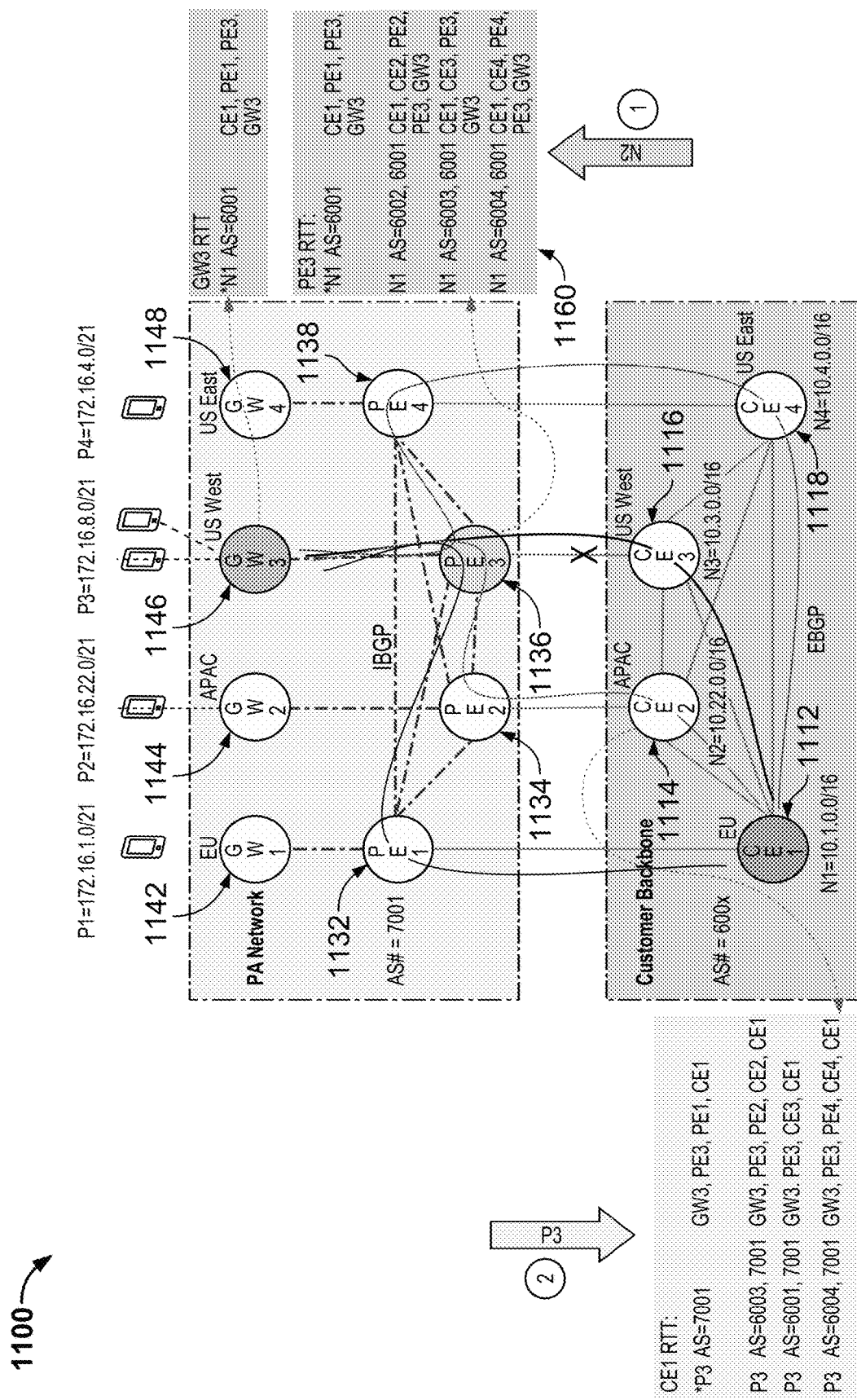
FIG. 11 is a system diagram of an example of a network topology of a customer backbone network including a customer edge device connected to a non-backup provider edge.

FIG. 11 is a system diagram of an example of a network topology of a customer backbone network including a customer edge device connected to a non-backup provider edge.

In this example, the customer backbone network 1100 corresponds with the customer backbone network 500 of FIG. 5. In some embodiments, GW1 1142, GW2 1144, GW3 1146, and GW4 1148 correspond with GW1 542, GW2 544, GW3 546, and GW4 548 of FIG. 5, respectively, PE1 1132, PE2 1134, PE3 1136, and PE4 1138 correspond with PE1 532, PE2 534, PE3 536, and PE4 538 of FIG. 5, respectively, and CE1 1112, CE2 1114, CE3 1116, and CE4 1118 correspond with CE1 512, CE2 514, CE3 516, and CE4 518 of FIG. 5, respectively.

Using GW3 1146 as an example, PE3 1136 is the primary node, and PE2 1134 is assigned as a backup node for PE3 1136; however, now the MU p3 is now trying to reach CE1 1112, which is connected to a non-backup PE. CE1 1112 is directly attached to PE1 1132. PE1 1132 and PE4 1138 are similar in that they are not the primary node and not a backup node. So, the best path (based on AS path length) goes from GW3 1146, to PE3 1136, to PE1 1132, and to CE1 1112 because it has the shortest AS path length. Also, the best path is the path used in cold potato routing, which can lead to asymmetric routing and dropped packets.

If the primary path (e.g., a link between PE1 1132 and CE1 1112) goes down, from CE1's routing table 1150, all of the other paths for route P3, which is 172.16.8.0/21, have the same AS path length. In the reverse direction, using PE3's routing table 1160, all the remaining paths for route N1, which is 10.1.0.0/16, have the same AS path length, which is two. In this example, traffic going from GW3 1146 to CE1 1112 is in a client to server (C2S) direction, and the reverse direction is server to client (S2C). So, the BGP selection tiebreaker criterion uses the router ID, which is random. Both directions are capable of selecting different paths, which leads to asymmetric routing.

Figure 12:
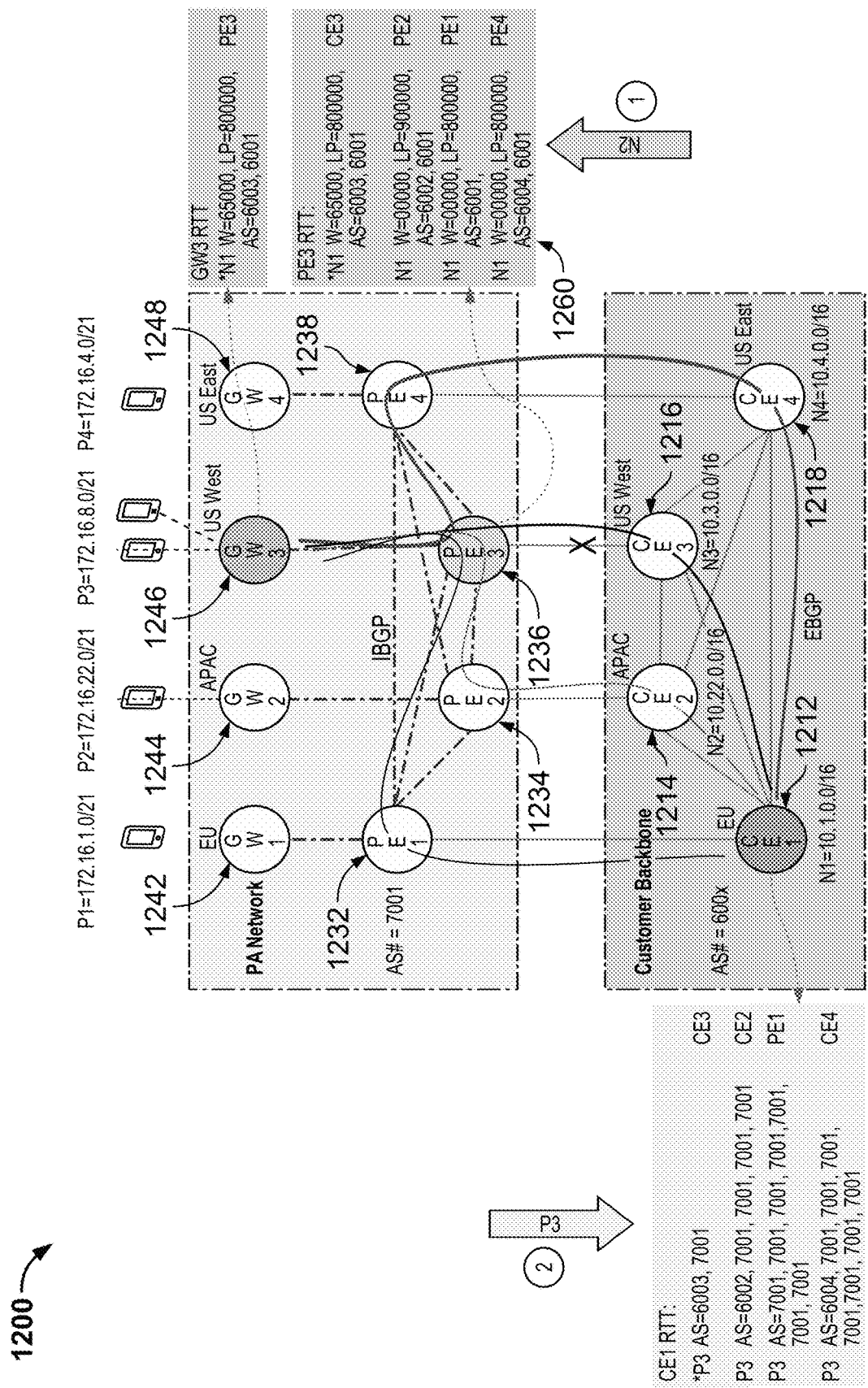
FIG. 12 is a system diagram of another example of a network topology of a customer backbone network including a customer edge device connected to a non-backup provider edge.

FIG. 12 is a system diagram of another example of a network topology of a customer backbone network including a customer edge device connected to a non-backup provider edge.

In this example, the customer backbone network 1200 corresponds with the customer backbone network 500 of FIG. 5. In some embodiments, GW1 1242, GW2 1244, GW3 1246, and GW4 1248 correspond with GW1 542, GW2 544, GW3 546, and GW4 548 of FIG. 5, respectively, PE1 1232, PE2 1234, PE3 1236, and PE4 1238 correspond with PE1 532, PE2 534, PE3 536, and PE4 538 of FIG. 5, respectively, and CE1 1212, CE2 1214, CE3 1216, and CE4 1218 correspond with CE1 512, CE2 514, CE3 516, and CE4 518 of FIG. 5, respectively.

In this scenario, in the export direction, when the primary route goes down, the backup route is determined non-deterministically causing asymmetrical routing and dropped packets. To prevent the scenario, the primary path includes a link between PE3 1236 and CE3 1216, which is also the shortest path for exiting from the provider network, and then the primary path goes to the desired customer data center from, for example, CE1 1212 via an extra hop to reach the destination data center. In the export direction, as shown in the CE1 routing table 1250, the primary path has the shortest AS path length, which is one. On the other hand, the backup path goes from PE3 1236 to PE2 1234, to CE2 1214, and then to CE1 1212. So, for an entry associated with a backup path and entries associated with the non-backup paths in the CE1 routing table 1250, three ASs are added to the entry, so the AS path length is four. For the non-backup paths, for example, PE3 1236 to PE1 1232 to CE1 1212 and PE1 1232 to PE4 1238 to CE4 1218 are non-backup paths. In the entries associated with the non-backup paths, an additional three ASs are further added to the entries, so the AS path length is seven. Accordingly, the AS path lengths for the three types of entries are different.

In the import direction, using the same technique, for the primary path including a link between PE3 1236 and CE3 1216, the weight of the path is increased to 65000, and for the other paths, the weights are set to zero, as shown in PE3's routing table 1260. For the backup path, the local preference is raised to 90000 for the path including a link between PE2 1234 and CE2 1214 while, and for the non-backup paths, the local preference remains the same at 80000, which is lower than the local preference for the backup path. In this scenario, if the primary path (the link between PE3 1236 and CE3 1216) goes down, based on CE1's routing table 1250, CE1 1212 selects the route having the shortest AS path length, which will include a link between CE2 1214 and PE2 1234. Also, based on PE3's routing table 1260, PE3 1236 selects the best path by identifying the route having the highest local preference. In this scenario, PE3 1236 selects the route having a local preference of 900000, so PE3 1236 will also select the path including a link between CE2 1214 and PE2 1234, so symmetric routing is maintained even after the primary path goes down because the same path is selected in both directions.

From a different perspective, if the primary path goes down, to determine the best path selection, first BGP looks at the weight. In this example, the weight for each entry is zero, so BGP cannot identify a single entry having the highest weight, and since multiple entries have the same weight, BGP looks at local preference. In this example, BGP then selects the entry having the highest local preference. In this case, because the selected path has the highest local preference, the selected path starts at PE3 1236, to PE2 1234, and to CE2 1214.

BGP assigns the weight as 65000 for this route having the highest weight received directly from EBGP peers and the other routes will be assigned a weight of zero when they are received from IBGP. As discussed earlier, the primary path has a link including PE3 1236 and CE3 1216. In addition, the next best path includes PE3 1236, to PE2 1234, and to CE2 1214. In this case, if the primary path goes down, BGP selects the backup path, which includes PE3 1236, to PE2 1234, and to CE2 1214.

Figure 13:
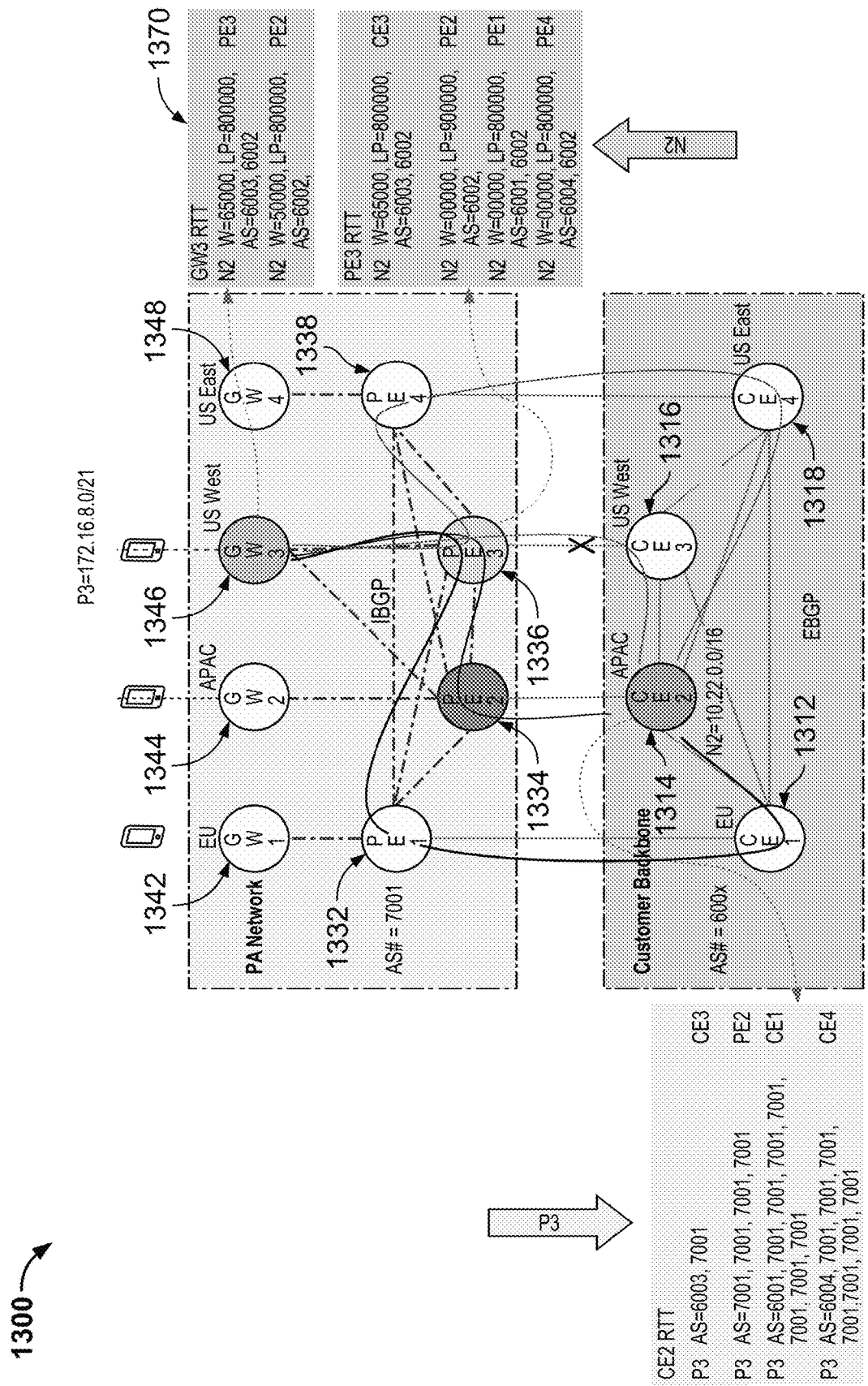
FIG. 13 is a system diagram of an example of a network topology of a customer backbone network including a gateway with dual-home connections.

FIG. 13 is a system diagram of an example of a network topology of a customer backbone network including a gateway with dual-home connections.

In this example, the customer backbone network 1300 corresponds with the customer backbone network 500 of FIG. 5. In some embodiments, GW1 1342, GW2 1344, GW3 1346, and GW4 1348 correspond with GW1 542, GW2 544, GW3 546, and GW4 548 of FIG. 5, respectively, PE1 1332, PE2 1334, PE3 1336, and PE4 1338 correspond with PE1 532, PE2 534, PE3 536, and PE4 538 of FIG. 5, respectively, and CE1 1312, CE2 1314, CE3 1316, and CE4 1318 correspond with CE1 512, CE2 514, CE3 516, and CE4 518 of FIG. 5, respectively.

However, if the node PE3 1336 goes down, both the primary path and the backup path cannot be selected because the paths include node PE3 1336. In this case, GW3 1346 has a dual connection to provide node protection (e.g., PE3 1336) as well. In the event that node PE3 1336 goes down, a path going from GW3 1346 to PE2 1334 to CE2 1314 is selected because node PE3 1336 is unavailable. In this scenario, GW3 1346 has connections to both PE3 1336 and PE2 1334. In some embodiments, one of the PEs acts as a backup PE in case the primary PE goes down. In the previous examples, GW3 1346 only has a connection to a single PE.

In this case, from GW3 1346, the best path includes PE3 1336 to CE3 1316 to CE2 1314, and the second best path includes PE3 1336 to PE2 1334 to CE2 1314, as a backup path, which is used when the primary path goes down due to, for example, a link failure. For example, a link between PE3 1336 and CE3 1316 fails. However, if the node PE3 1336 goes down, then the path going from GW3 1346 to PE2 1334 to CE2 1314 is selected, as shown in GW3's routing table 1370.

Figure 14:
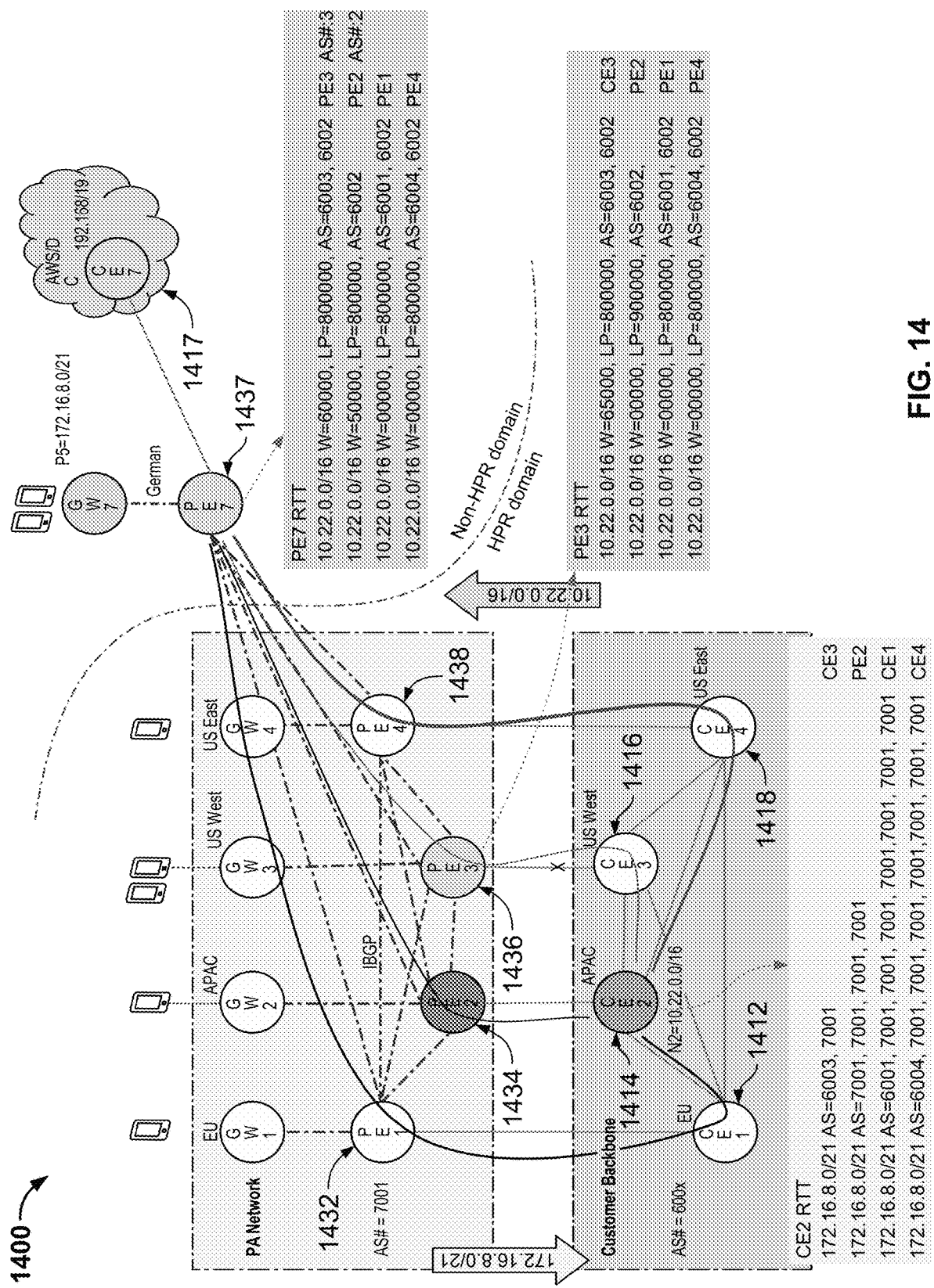
FIG. 14 is a system diagram of an example of a network topology of a customer backbone network including a heterogeneous network.

FIG. 14 is a system diagram of an example of a network topology of a customer backbone network including a heterogeneous network.

In this example, the customer backbone network 1400 corresponds with the customer backbone network 500 of FIG. 5. In some embodiments, PE1 1432, PE2 1434, PE3 1436, and PE4 1438 correspond with PE1 532, PE2 534, PE3 536, and PE4 538 of FIG. 5, respectively, and CE1 1412, CE2 1414, CE3 1416, and CE4 1418 correspond with CE1 512, CE2 514, CE3 516, and CE4 518 of FIG. 5, respectively.

In some embodiments, in addition to their main backbone, some customers have one or more isolated data centers. For example, a customer has a data center CE7 1417 in the cloud, such as Amazon Web Services (AWS), Azure, or Google Cloud Platform (GCP), while another data center CE1 1412, CE2 1414, CE3 1416, or CE4 1418 is in a fully meshed eBGP Network. This data center CE7 1417 does not have a BGP connection to any node of the customer backbone.

In this example, there are two domains where one domain is a hot potato routing (HPR) domain and another domain is a non-HPR domain. In this example, the HPR domain is the customer network, and the non-HPR domain PE7 1437 is connected to its primary node PE3 1436. PE3 1436 is the primary node to the PE7 1437 because it is the closest node. Also, PE2 1434 is a backup node to PE3 1436. So, PE3 1436 will use a path including a link between PE3 1436 and CE3 1416 as its primary path, and will use a path including a link between PE2 1434 and CE2 1414 as its backup path, so hot potato routing and symmetrical routing is guaranteed, even if the primary path goes down. For example, a link between CE3 1416 and PE3 1436 fails or node PE3 1436 itself fails.

When the primary path is running, both directions select the primary path including the link between PE3 1436 and CE3 1416, so the routing is symmetric. When the primary path is unavailable, the backup path including the link between PE2 1434 and CE2 1414 is determined deterministically because the routing technique implements the HPR domain technique.

FIG. 15 is a table summarizing various hot potato routing techniques. In the table 1500, in the route import direction for the primary EBGP peer, the PE will use weight and local preference to influence imported routes from the data center to help existing mobile users to send the network traffic to the nearest data center instead of traversing PE to PE fabric to comply with the hot potato routing requirement. In the route export direction for the primary EBGP peer, the PE will add an extra AS path prepend for the mobile user routes getting exported from the PE to the data center to help the symmetrical return of data center to mobile user traffic. The paths are divided by three categories: primary path, backup path, and non-backup path. For each mobile user, a primary gateway and a primary PE pair is selected by its proximity. For each primary PE or service connection (SC), a backup PE is assigned, so each PE has a unique backup, but a backup PE can back up more than one primary PE, so a backup PE can have a one-to-many relationship with primary PEs.

BGP community (BGP COM) and the extended community (ECOM) are used as instructions, such as mobile user route prefix identifier and path identifier. The instructions and the identifiers are inserted at each hop, and distributed together with BGP routes. Based on the instructions and identifiers, a proper number of AS can be prepended when routes are exported and a proper weight and local preference can be assigned when routes are imported.

Figure 16:
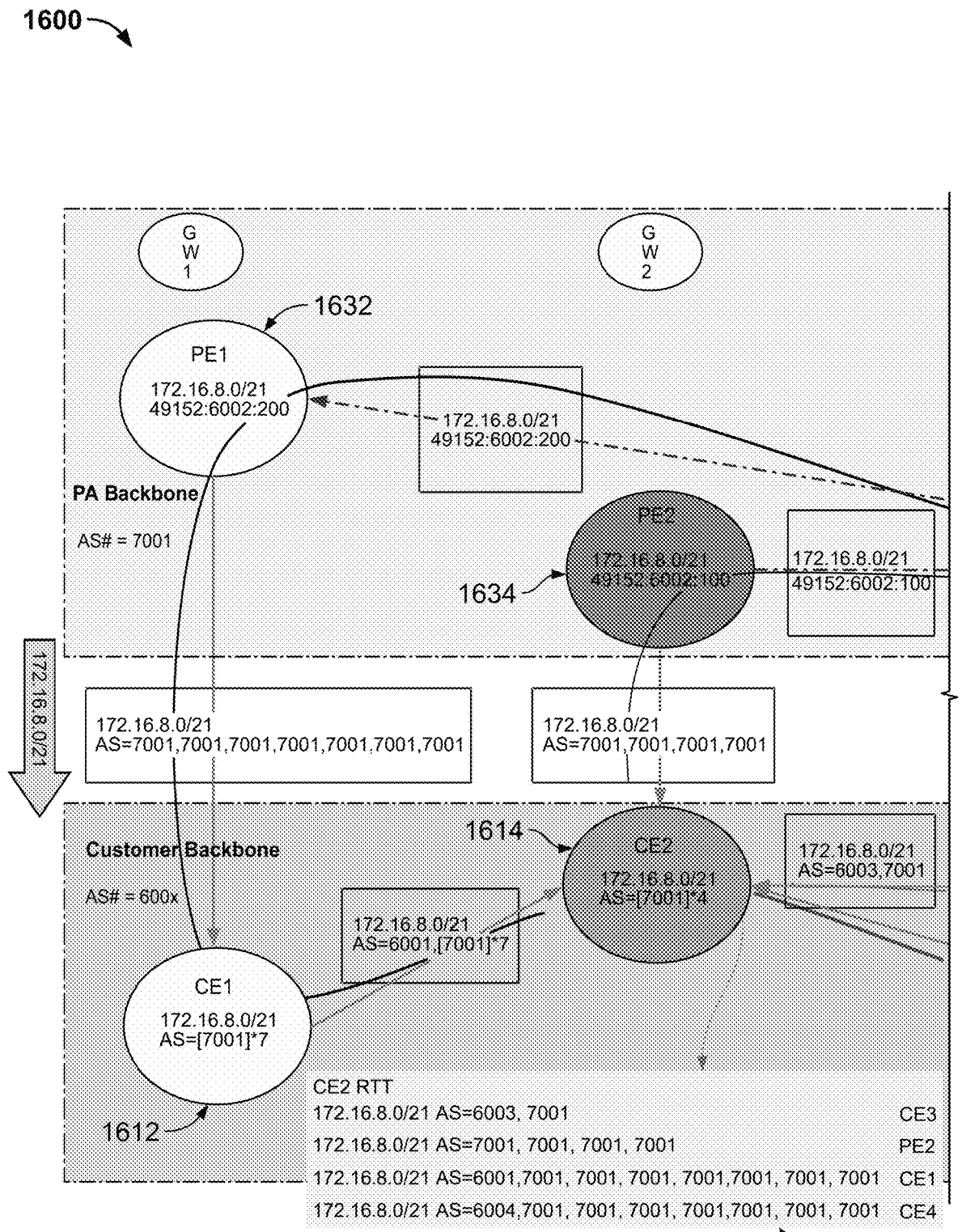
FIG. 16 is a system diagram of an example of a network topology of a customer backbone network including a client to server route advertisement.
Figure 16:
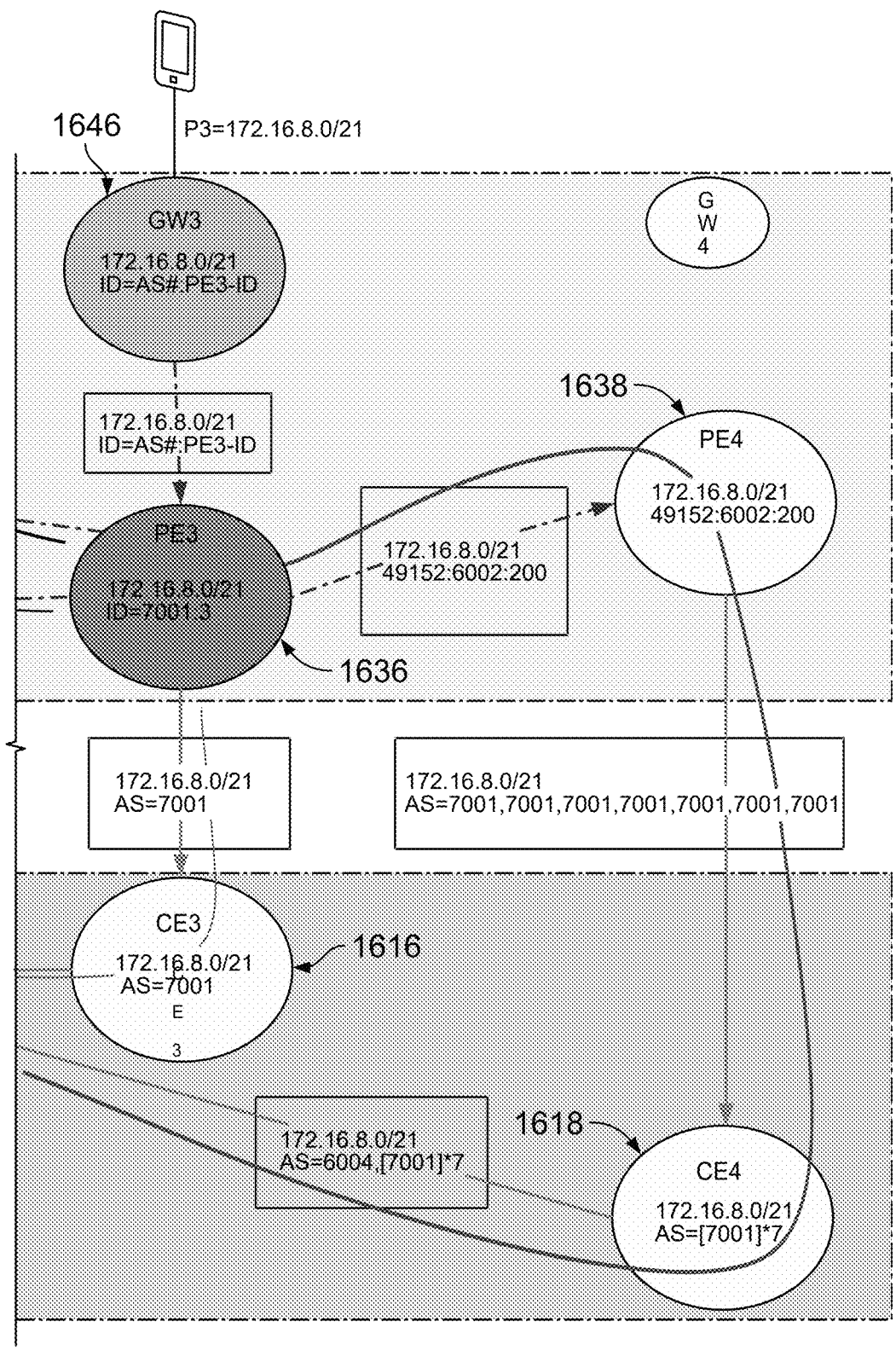

FIG. 16 is a system diagram of an example of a network topology of a customer backbone network including a client to server route advertisement.

In this example, the customer backbone network 1600 corresponds with the customer backbone network 500 of FIG. 5. In some embodiments, GW3 1646 corresponds with GW3 546 of FIG. 5, PE1 1632, PE2 1634, PE3 1636, and PE4 1638 correspond with PE1 532, PE2 534, PE3 536, and PE4 538 of FIG. 5, respectively, and CE1 1612, CE2 1614, CE3 1616, and CE4 1618 correspond with CE1 512, CE2 514, CE3 516, and CE4 518 of FIG. 5, respectively.

On the provider network of the customer backbone network 1600, PE3 1636 is to be GW3 1646's primary PE, because PE3 1636 is the closest PE to GW3 1646. In another example, if PE4 1638 is the closest PE to GW3 1646 then PE4 1638 is GW3 1646's primary PE. However, in this example, the PE3 1636 is the closest PE, and PE2 1634 will be designated as PE3 1636's backup. The route P3, which is 172.16.8.0/21, is being advertised from the provider network to the customer backbone. In GW3 1646, BGP creates a COM using AS number and PE3 1636's ID as its BGP community ID, and this information is distributed by IBGP to PE3 1636. When PE3 1636 receives this information, PE3 1636 assesses this ID, PE3 identifies itself as the primary PE of GW3 1646, and then PE3 1636 advertises this route through IBGP to PE2 1634. In this case, PE2 1634 is designated as a backup to PE3 1636. Therefore, PE3 1636 adds an extended community with a special value of 49152:6002:100 before advertising the route to PE2 1634. PE3 1636 also sends this route to PE4 1638. However, PE4 1638 is not a backup to PE3 1636, so PE3 1636 adds an extended community with a special value of 49152:6002:200 before advertising the route to PE4 1638. The same operation is also applied to PE1 1632, and the same route is reflected to PE1 1632 by PE3 1636 because PE1 1632 is also not a backup. The backup gets an extended community special value of 49152:6002:100, and the non-backup gets an extended community special value of 49152:6002:200.

PE3 1636 will advertise the route 172.16.8.0/21 to CE3 1616, which is through an EBGP connection, because PE3 1636 knows that CE3 1616 is directly connected as an EBGP peer. CE3 1616 is the primary path, so PE3 1636 only prepends one AS number to the route. The AS number is 7001, only one AS number is prepended.

In the next step, PE2 1634 also advertises the same prefix or route to CE2 1614. PE2 1634 learns that CE2 1614 is a backup path for this prefix because of the extended community 49152:6002:100 received with this route, so PE2 1634 prepends a total of four AS numbers, and then advertises the route to CE2 1614.

The backup path is received by CE2 1614 from PE2 1634 and is complete. In the next step, PE1 1632 will advertise the same route 172.16.8.0/21 to CE1 1612, and from looking at the instruction of BGP extended community received with the BGP route, learns that the instruction is 49152:6002:200, so PE1 1632 knows that it is a non-backup, so PE1 1632 is to prepend a total of seven AS numbers (or three more than the backup route). When CE1 1612 receives its routes, the route will have a total AS path length of seven.

Next, similar operations are performed with PE4 1638 because PE4 1638 received the instructions of 49152:6002:200. PE4 1638 will prepend a total of seven AS numbers when advertising over EBGP to CE4 1618.

Using the route received from PE3 1636, CE3 1616 will advertise the received route to CE2 1614 as well through EBGP, and CE3 1616 will add its own AS path, so its own AS number 6003 will be prepended to the AS path. Accordingly, CE2 1614 receives the route, and the route is complete. CE2 1614 will add the route to its routing table 1650.

Looking at the next two paths, CE1 1612 will also advertise the same prefix to CE2 1614. In this case, CE1 1612 prepends its own AS path, which is 6001, so there is a total of eight AS numbers. Now, CE2 1614 received this path from CE1 1612. This path will have an AS path that is longer than the primary path and longer than the backup path. Similarly, CE4 1618 is sending the same route, as CE1 1612, to CE2 1614, so CE4 1618 and CE1 1612 will perform the same behavior. CE4 1618 prepends its own AS number to the AS number already received, so this path will have the longest AS path length. When CE2 1614 receives this route, the path is completed.

When looking at the routing table 1650 in the client to server direction, the best path will be the path including a link between PE3 1636 and CE3 1616, the second best path will be the path including a link between PE2 1634 and CE2 1614. The path including the link between PE3 1636 and CE3 1616 conforms with the hot potato routing criteria, the path including a link between PE2 1634 and CE2 1614 will be the second best, and the other non-backup paths include a link between PE1 1632 and CE1 1612 and a link between PE4 1638 and CE4 1618.

Figure 17:
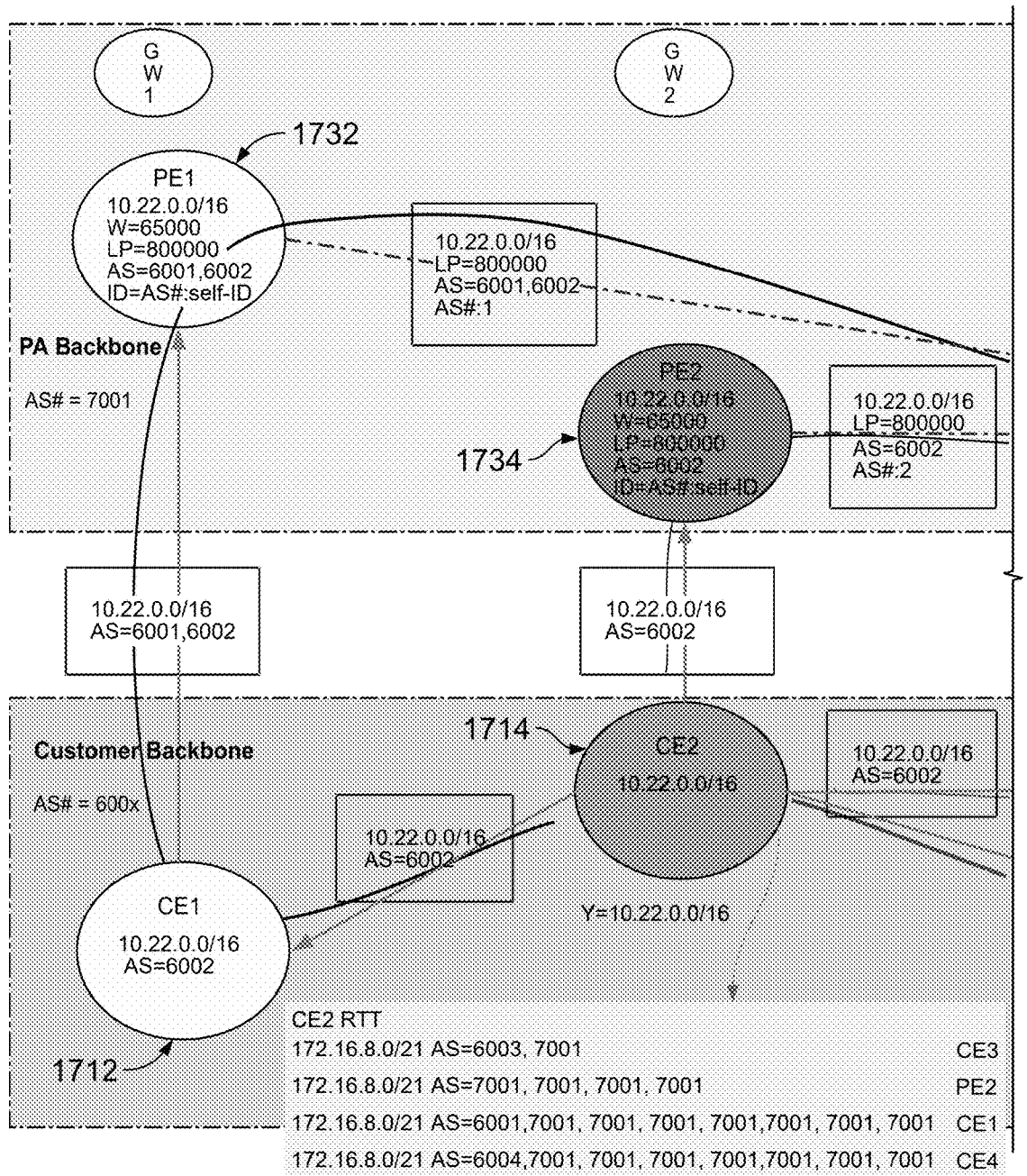
FIG. 17 is a system diagram of an example of a network topology of a customer backbone network including server to a client route advertisement.
Figure 17:
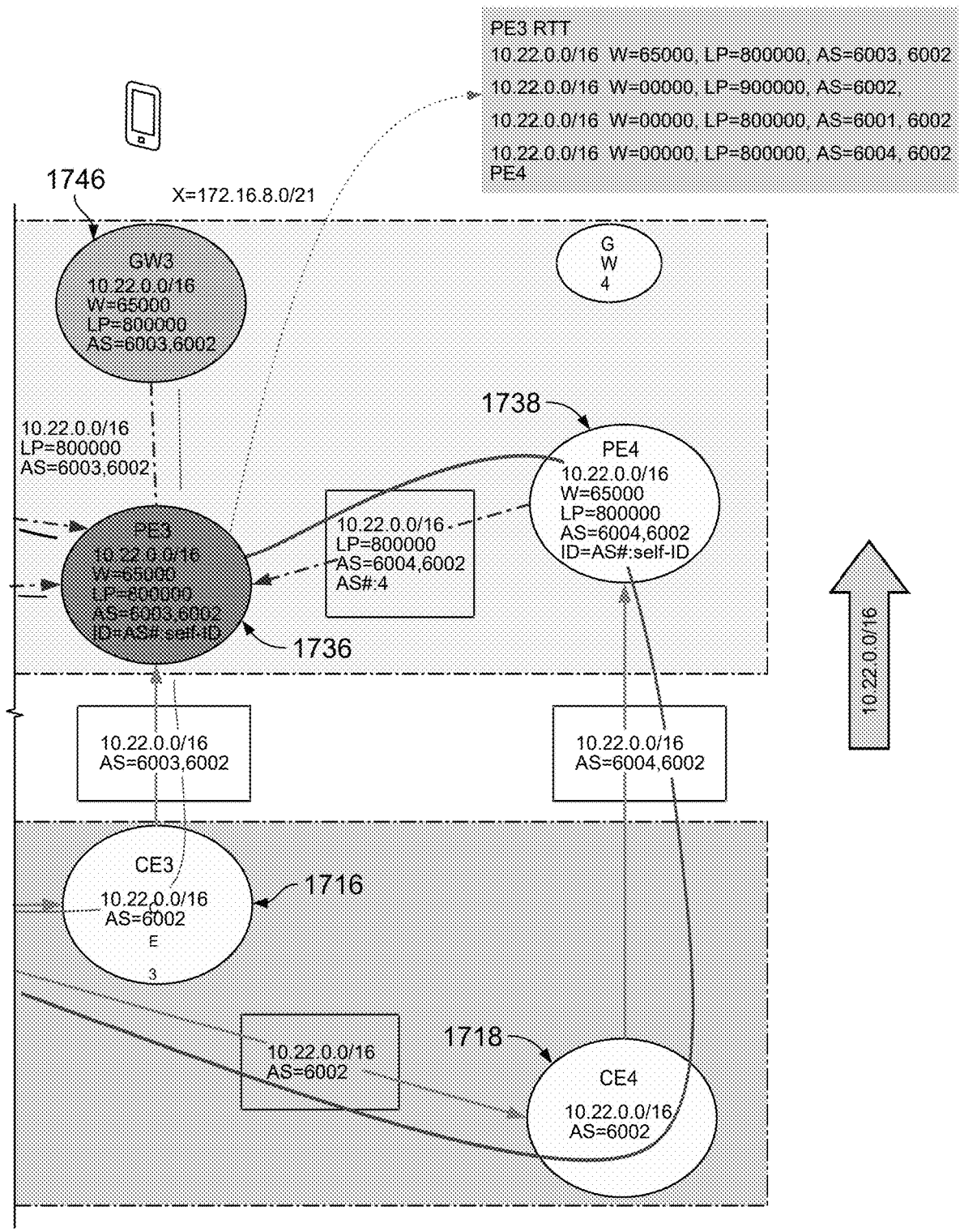

FIG. 17 is a system diagram of an example of a network topology of a customer backbone network including server to a client route advertisement.

In this example, the customer backbone network 1700 corresponds with the customer backbone network 1600 of FIG. 16. In some embodiments, GW3 1746 corresponds with GW3 1646 of FIG. 16, PE1 1732, PE2 1734, PE3 1736, and PE4 1738 correspond with PE1 1632, PE2 1634, PE3 1636, and PE4 1638 of FIG. 16, respectively, and CE1 1712, CE2 1714, CE3 1716, and CE4 1718 correspond with CE1 1612, CE2 1614, CE3 1616, and CE4 1618 of FIG. 16, respectively.

In the reverse direction with respect to the customer backbone network 1600 of FIG. 16, which is in the server to client direction, CE2 1714 advertises a customer subnet 10.22.0.0/16 to nodes in the provider network. To begin, CE2 1714 advertises a customer subnet to CE3 1716 and prepends its own AS number. For example, from CE2 1714, the AS number is 6002. The same thing happened to CE1 1712 and CE4 1718, which is standard BGP behavior in the customer network. Subsequently, each CE will advertise these routes to its connected PE nodes in the provider network. For example, when CE3 1716 advertises the route to PE3 1736, CE3 1716 will prepend its own AS number, so the AS path length will be two. When PE3 1736 receives this route, there are three operations to be performed. First, no change will be made to the AS number; second, the weight is set to 65000, and the local preference is set to 800000. In addition, BGP community adds PE3 1736's ID to this route to identify the first hop to receive this route, a self ID.

From PE3 1736's point of view, the path has a weight of 65000, a local preference of 800000, and the AS path length is two. Next, CE2 1714 advertises the same routes to PE2 1734. When PE2 1734 receives this route, PE2 1734 will also raise the weight received via BGP to 65000, increase the local preference to 800000, and also add its own ID as a BGP community to identify itself. The ID will be PE2 1734's ID. The same thing happened at CE1 1712 where the weight is increased to 65000, the local preference will be increased to 800000, and the self ID here will be PE1 1732. The same three things happen at PE4 1738, where each PE add its own ID represented as BGP regular community to its received route directly from EBGP peers.

In the next step, PE2 1734 will send the route received from CE2 1714 to PE3 1736, so the same route will also be received by PE3 1736 from PE2 1734. This route includes an unchanged AS path number including its unchanged local preference. Now, when PE3 1736 receives this route, PE3 1736 will increase the local preference to 900000 from 800000, because PE3 1736 knows that PE2 1734 is its backup. So, when PE3 1736 receives the route from its backup PE2 1734, PE3 1736 will raise its local preference to make the local preference higher than the local preference of PE2 1734, and the weight is locally set to zero.

PE3 1736 also receives the route from a non-backup PE (e.g., PE1 1732). The non-backup node will send these routes to PE3 1736 where the local preference remains unchanged and the AS path remains unchanged, but the ID will be the PE1 1732's ID.

For a route received from the non-backup PE, e.g., PE1 1732, the weight will be zero and the received local preference will remain unchanged. For example, for the non-backup PE1 1732, if the local preference received is 800000, the local preference will be unchanged. However, the local preference for the backup node will be much higher than 800000. The same scenario happens for a route received from PE4 1738. PE4 1738 will also send a route to PE3 1736. When PE3 1736 receives the route from non-backup PE4 1738, PE3 1736 does not make any changes to the local preference and just adds the route to its routing table. In this example, the routing table for PE3 1736 has been completed.

In summary, the primary route has the highest weight, and the backup route has the highest local preference. When BGP selects the best path, BGP first looks at the weight, and only the primary path has the highest weight while the other paths have a weight of zero. After BGP finds the best path, BGP will stop looking at the local preference or the AS path length.

If the primary path is no longer available, of the remaining three paths, BGP first looks at the weight. In this case, all of the weights are tied at zero, so next BGP looks at local preference. Now the local preference deterministically determines that the backup path is the best, because the backup path has a 900000 local preference value while the other two paths have an 800000 local preference value, so BGP selects the path having the highest local preference value. The primary path and the backup path are both selected using hot potato routing.

Figure 18:
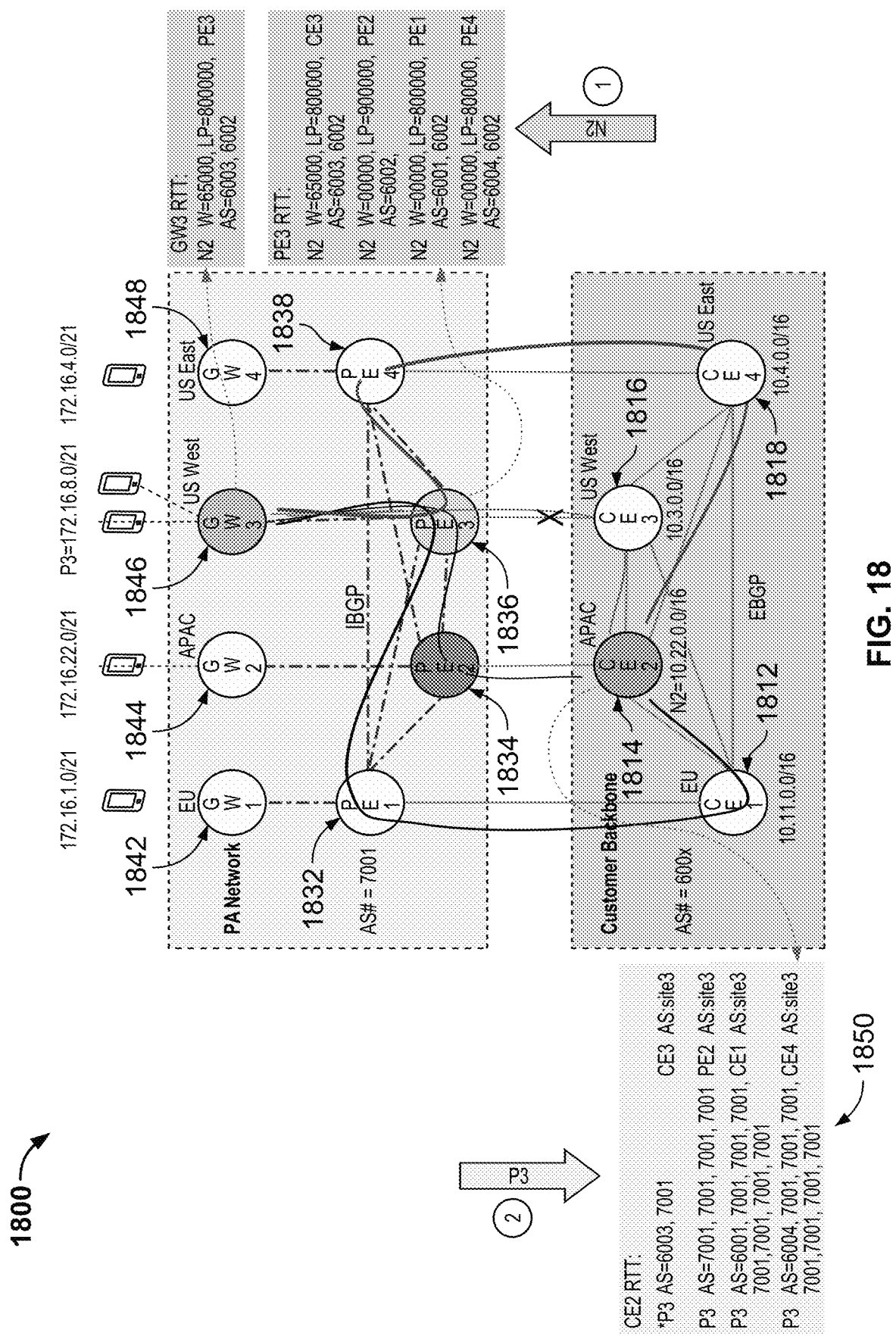
FIG. 18 is a system diagram of an example of a network topology of a customer backbone network including a data center directly connected to a backup provider edge.

FIG. 18 is a system diagram of an example of a network topology of a customer backbone network including a data center directly connected to a backup provider edge.

In this example, the customer backbone network 1800 corresponds with the customer backbone network 500 of FIG. 5. In some embodiments, GW1 1842, GW2 1844, GW3 1846, and GW4 1848 correspond with GW1 542, GW2 544, GW3 546, and GW4 548 of FIG. 5, respectively, PE1 1832, PE2 1834, PE3 1836, and PE4 1838 correspond with PE1 532, PE2 534, PE3 536, and PE4 538 of FIG. 5, respectively, and CE1 1812, CE2 1814, CE3 1816, and CE4 1818 correspond with CE1 512, CE2 514, CE3 516, and CE4 518 of FIG. 5, respectively.

The best path goes from GW3 1846 to PE3 1836 to CE3 1816, and to CE2 1814, which satisfies the hot potato routing criteria where in one direction the path is selected by weight, and in the other direction the path is selected by the shortest AS path length.

If the primary path goes away, then the backup path is selected using local preference because the backup path has the highest local preference, and the other two paths have the next highest local preference. When going in the export direction, which is from GW3 1846 to the CE2 1814, nodes on the provider network prepend its AS number. When going in the import direction, nodes on the provider network use weights and the local preference to determine a packet's route. The primary path is determined using the weight, and the backup path is determined using the local preference. Because weights and local preferences are used to determine the best path, the customer does not need to do any special configuration.

In the event that both the primary path (a link between CE2 1814 and PE2 1834) and the backup path (a link between CE3 1816 and PE3 1836) both fail (a double failure), then a non-backup path will be selected; however, in this case, one of the non-backup paths of the two remaining non-backup paths will be selected randomly, so the cold potato routing issue can occur again with a potential asymmetric routing issue.

Figure 19:
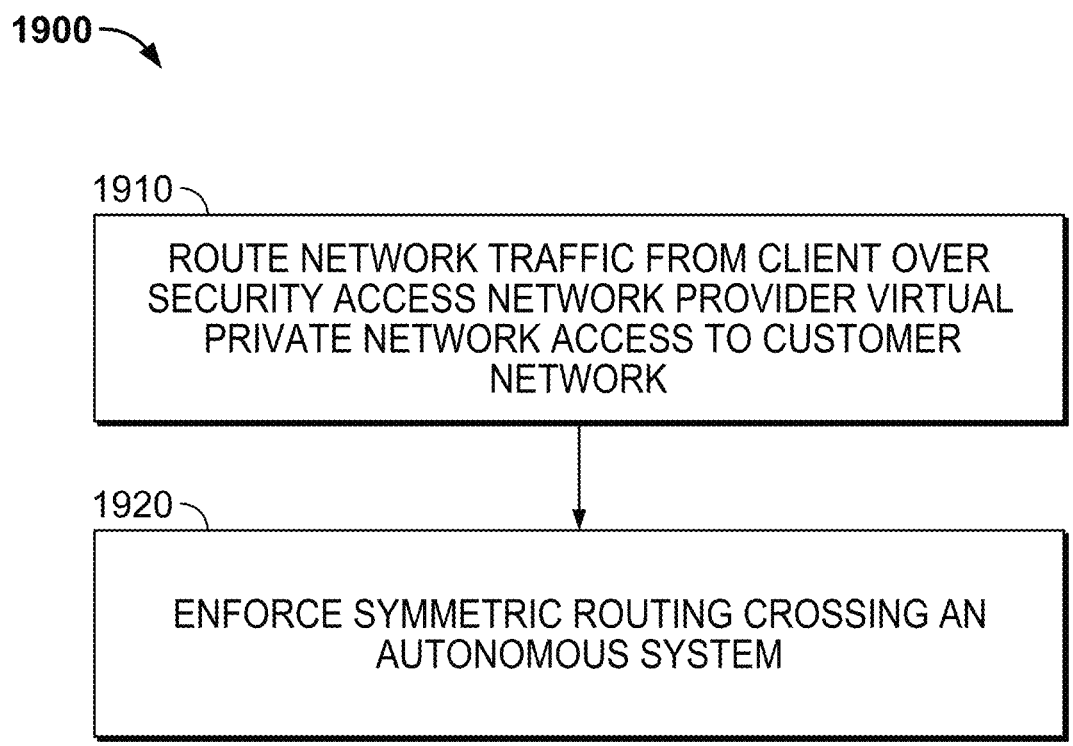
FIG. 19 is a flow diagram illustrating a process for deploying symmetric routing.

FIG. 19 is a flow diagram illustrating a process for deploying symmetric routing and hot potato routing domain. In some embodiments, the process 1900 is implemented by a network gateway 202 of FIG. 2, any portal of FIG. 6, any GW of FIGS. 5, 7-14, and 16-18, or any PE of FIGS. 5-14 and 16-18 and comprises:

In 1910, the network gateway routes network traffic from a client over a security access network provider virtual private network (VPN) access to a customer network.

In 1920, the network gateway enforces symmetric routing crossing an autonomous system (AS) based on one or more prepended AS routing numbers in a first routing table for inbound traffic and/or based on one or more weights and one or more local preferences in a second routing table for outbound traffic.

Figure 20:
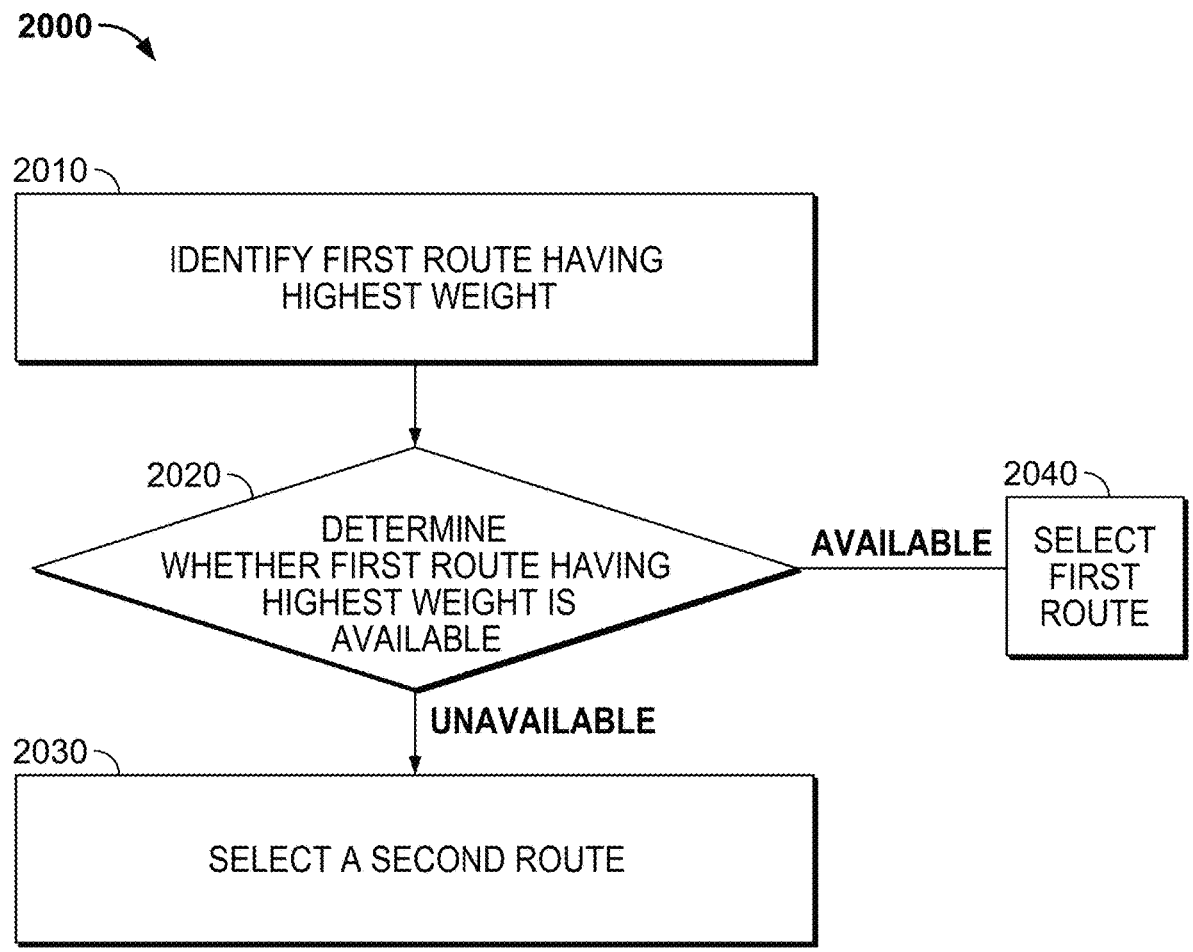
FIG. 20 is a flow diagram illustrating a process for enforcing symmetric routing crossing an autonomous system in accordance with some embodiments.

FIG. 20 is a flow diagram illustrating a process for enforcing symmetric routing crossing an autonomous system in accordance with some embodiments. In some embodiments, the process 2000 is an implementation of operation 1920 of FIG. 19 and comprises:

In 2010, the network gateway identifies a first route having the highest weight based on the second routing table for outbound traffic.

In 2020, the network gateway determines whether the first route having the highest weight is available.

In 2030, in response to a determination that the first route having the highest weight is unavailable, the network gateway selects a second route having the highest local preference based on the second routing table.

In 2040, in response to a determination that the first route having the highest weight is available, the network gateway selects the first route.

Figure 21:
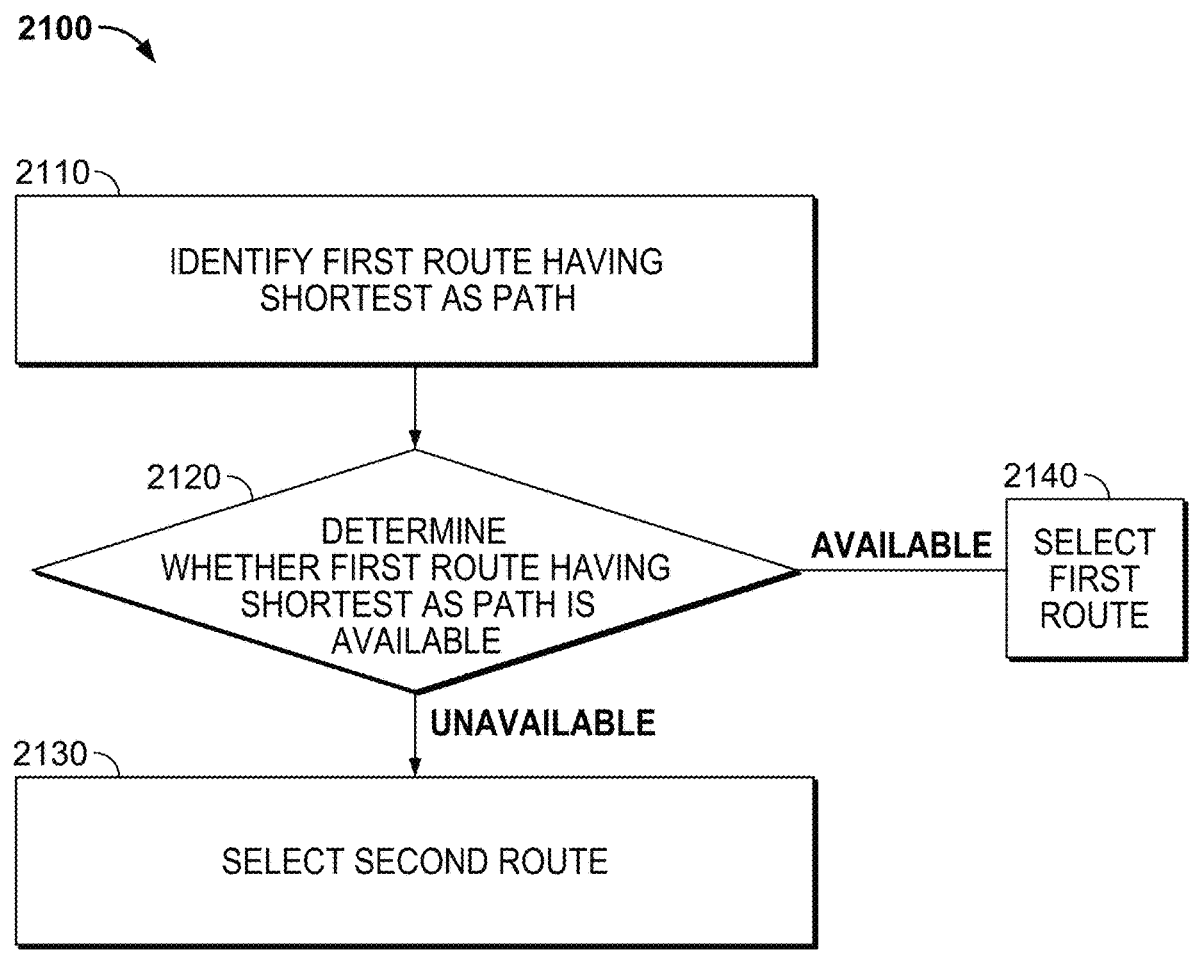
FIG. 21 is a flow diagram illustrating another process for enforcing symmetric routing crossing an autonomous system in accordance with some embodiments.

FIG. 21 is a flow diagram illustrating another process for enforcing symmetric routing crossing an autonomous system in accordance with some embodiments. In some embodiments, the process 2100 is an implementation of operation 1920 of FIG. 19 and comprises:

In 2110, the network gateway identifies a first route having a shortest AS path based on the first routing table for inbound traffic.

In 2120, the network gateway determines whether the first route having the shortest AS path is available.

In 2130, in response to a determination that the first route having the shortest AS path is unavailable, the network gateway selects a second route having the next shortest AS path based on the second routing table.

In 2140, in response to a determination that the first route having the shortest AS path is available, the network gateway selects the first route.

Some of the benefits of the hot potato routing techniques include no requirement to alter the customer network configuration. Also, existing routing techniques such as open shortest path first (OSPF) techniques can perform hot potato routing, but OSPF itself cannot be used to resolve an asymmetrical routing problem crossing an AS boundary. Source Network Address Translation (SNAT) can resolve symmetric return locally, but since SNAT requires IP addresses to be changed, end to end IP address-based security cannot be implemented.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A system, comprising:
a processor configured to:
route network traffic from a client over a security access network provider virtual private network (VPN) access to a customer network; and
enforce symmetric routing crossing an autonomous system (AS) based on one or more prepended AS routing numbers in a first routing table for inbound traffic and based on one or more weights and one or more local preferences in a second routing table for outbound traffic, comprising to:
for the inbound traffic:
determine that a plurality of routes of the first routing table has a shortest AS path length, wherein the plurality of routes includes a first route and a second route; and
in response to a determination that the plurality of routes has the shortest AS path length:
determine that the first route of the first routing table has a shortest AS path length, wherein the first route is a primary route of the first routing table, and wherein the one or more prepended AS routing numbers are prepended to the second route of the first routing table, the second route being a backup route of the first routing table; and
in response to a determination that the first route has the shortest AS path length, route the inbound traffic based on the first route; and
a memory coupled to the processor and configured to provide the processor with instructions.

2. The system of claim 1, wherein the enforcing of the symmetric routing crossing the AS comprises to:
identify a third route having the highest weight based on the second routing table for outbound traffic;
determine whether the third route having the highest weight is available; and
in response to a determination that the third route having the highest weight is unavailable, select a fourth route having the highest local preference based on the second routing table.

3. The system of claim 2, wherein the enforcing of the symmetric routing crossing the AS further comprises to:
in response to a determination that the third route having the highest weight is available, select the third route.

4. The system of claim 1, wherein the enforcing of the symmetric routing crossing the AS comprises to:
determine whether the first route having the shortest AS path is available; and
in response to a determination that the first route having the shortest AS path is unavailable, select the second route having the next shortest AS path based on the first routing table.

5. The system of claim 1, wherein the AS includes at least one node on the security access network provider VPN and at least one node on the customer network.

6. The system of claim 1, wherein the security access network provider virtual private network (VPN) access is clientless or client-based.

7. The system of claim 1, wherein a primary route is assigned the highest weight in the second routing table.

8. The system of claim 1, wherein a backup route is assigned the highest local preference in the second routing table.

9. The system of claim 1, wherein:
a primary route is assigned the highest weight in the second routing table; and
a backup route is assigned the highest local preference in the second routing table.

10. A method, comprising:
routing, using a processor, network traffic from a client over a security access network provider virtual private network (VPN) access to a customer network; and
enforcing, using the processor, symmetric routing crossing an autonomous system (AS) based on one or more prepended AS routing numbers in a first routing table for inbound traffic and based on one or more weights and one or more local preferences in a second routing table for outbound traffic, comprising:
for the inbound traffic:
determining that a plurality of routes of the first routing table has a shortest AS path length, wherein the plurality of routes includes a first route and a second route; and
in response to a determination that the plurality of routes has the shortest AS path length:
determining that the first route of the first routing table has a shortest AS path length, wherein the first route is a primary route of the first routing table, and wherein the one or more prepended AS routing numbers are prepended to the second route of the first routing table, the second route being a backup route of the first routing table; and
in response to a determination that the first route of the first routing table has the shortest AS path length, routing the inbound traffic based on the first route of the first routing table.

11. The method of claim 10, wherein the enforcing of the symmetric routing crossing the AS comprises:
identifying a third route having the highest weight based on the second routing table for outbound traffic;
determining whether the third route having the highest weight is available; and
in response to a determination that the third route having the highest weight is unavailable, selecting a fourth route having the highest local preference based on the second routing table.

12. The method of claim 11, wherein the enforcing of the symmetric routing crossing the AS further comprises:
in response to a determination that the third route having the highest weight is available, selecting the third route.

13. The method of claim 10, wherein the enforcing of the symmetric routing crossing the AS comprises:
determining whether the first route having the shortest AS path is available; and
in response to a determination that the first route having the shortest AS path is unavailable, selecting the second route having the next shortest AS path based on the first routing table.

14. The method of claim 10, wherein the AS includes at least one node on the security access network provider VPN and at least one node on the customer network.

15. The method of claim 10, wherein the security access network provider virtual private network (VPN) access is clientless or client-based.

16. The method of claim 10, wherein a primary route is assigned the highest weight in the second routing table.

17. The method of claim 10, wherein a backup route is assigned the highest local preference in the second routing table.

18. The method of claim 10, wherein:
- a primary route is assigned the highest weight in the second routing table; and
- a backup route is assigned the highest local preference in the second routing table.

19. A computer program product embodied in a non-transitory computer readable medium and comprising computer instructions for:
- routing network traffic from a client over a security access network provider virtual private network (VPN) access to a customer network; and
- enforcing symmetric routing crossing an autonomous system (AS) based on one or more prepended AS routing numbers in a first routing table for inbound traffic and based on one or more weights and one or more local preferences in a second routing table for outbound traffic, comprising:
  for the inbound traffic:
  - determining that a plurality of routes of the first routing table has a shortest AS path length, wherein the plurality of routes includes a first route and a second route; and
  - in response to a determination that the plurality of routes has the shortest AS path length:
    - determining that the first route of the first routing table has a shortest AS path length, wherein the first route is a primary route of the first routing table, and wherein the one or more prepended AS routing numbers are prepended to the second route of the first routing table, the second route being a backup route of the first routing table; and
    - in response to a determination that the first route of the first routing table has the shortest AS path length, routing the inbound traffic based on the first route of the first routing table.

\* \* \* \* \*